United States Patent [19]
Wong

[11] Patent Number: 5,798,958
[45] Date of Patent: Aug. 25, 1998

US005798958A

[54] ZERO DETECT FOR BINARY SUM

[75] Inventor: Roney S. Wong, Sunnyvale, Calif.

[73] Assignee: Samsung Electronics Co., Ltd., Rep. of Korea

[21] Appl. No.: 658,454

[22] Filed: Jun. 5, 1996

[51] Int. Cl.[6] .................................................. G06F 7/50
[52] U.S. Cl. ............... 364/768; 364/748.05; 364/748.11
[58] Field of Search ..................... 364/736.5, 748, 364/715.04, 715.09, 737, 788, 787, 710.11, 760.01, 760.05, 769, 748.01, 768, 748.05, 748.11; 340/146.1; 377/28

[56] References Cited

U.S. PATENT DOCUMENTS

| | | | |
|---|---|---|---|
| 3,573,726 | 4/1971 | Towell et al. | 340/146.1 |
| 4,218,751 | 8/1980 | McManigal | 364/715.012 |
| 4,631,696 | 12/1986 | Sakamoto | 364/748 |
| 4,924,422 | 5/1990 | Vassiliadis et al. | 364/715.09 |
| 5,020,016 | 5/1991 | Nakano et al. | 364/736.5 |
| 5,027,308 | 6/1991 | Sit et al. | 364/748 |
| 5,038,313 | 1/1991 | Kojima | 364/736.5 |
| 5,060,243 | 10/1991 | Eckert | 377/28 |
| 5,241,490 | 8/1993 | Poon | 364/715.04 |
| 5,367,477 | 11/1994 | Hinds et al. | 364/736.5 |
| 5,373,459 | 12/1994 | Taniguchi | 364/715.012 |
| 5,448,509 | 9/1995 | Lee et al. | 364/737 |
| 5,469,377 | 11/1995 | Amano | 364/748 |
| 5,508,950 | 4/1996 | Bosshart et al. | 364/736.5 |
| 5,519,649 | 5/1996 | Takahashi | 364/736.5 |
| 5,561,619 | 10/1996 | Watanabe et al. | 364/736.5 |
| 5,581,496 | 12/1996 | Lai et al. | 364/736.5 |
| 5,586,069 | 12/1996 | Dockser | 364/736.5 |
| 5,600,583 | 2/1997 | Bosshart et al. | 364/736.5 |
| 5,635,858 | 6/1997 | Chang et al. | 326/53 |

OTHER PUBLICATIONS

Paper entitled: "An American National Standard—IEEE Standard for Binary Floating-Point Arithmetic", ANSI/IEEE Std 754-1985, Standards Committee of the IEEE Computer Society, Title page, Foreward page, Contents page, and pp. 7-18, 1985.

*Primary Examiner*—Reba I. Elmore
*Assistant Examiner*—Robert J. Dolan
*Attorney, Agent, or Firm*—Skjerven, Morrill, MacPherson, Franklin & Friel, LLP; David M. Sigmond

[57] ABSTRACT

Zero detect of a sum of binary operands is disclosed. If the sum is zero, the bit-complement of the sum is a string of one's, and therefore incrementing the string of one's generates a carry-out bit of one. Likewise, if the sum is non-zero, the bit-complement of the sum will contain one or more zero's, and therefore incrementing the bit-complemented sum will not generate a carry-out bit of one. One embodiment includes providing a result representing a bit-complement of the sum, and then inspecting a carry-out bit generated by incrementing the result. Another embodiment includes bit-complementing first and second operands, generating a first carry-out bit from a sum of the bit-complemented first and second operands and a constant of one, generating a second carry-out bit from a sum of the bit-complemented first and second operands and a constant of two, and setting a zero detect flag to TRUE when an EXCLUSIVE-OR of the first carry-out bit and the second carry-out bit is a one. Advantageously, the first and second carry-out bits can be generated concurrently using carry chains to provide rapid zero detect. The invention is well-suited for providing zero detect of the sum A+B where A and B are n-bit binary operands, as well as zero detect of the sum A+B+C where A and B are n-bit binary operands and C is a carry-in bit.

66 Claims, 20 Drawing Sheets

ZERO DETECT FOR BINARY SUM

BACKGROUND OF THE INVENTION

1. Field of the Invention

The present invention relates to zero detection, and more particularly to detecting whether a sum of two or more binary operands is zero.

2. Description of Related Art

In floating-point calculations, the result of an arithmetic operation usually has to be rounded in order to be represented by another floating-point number with the same precision as the operands. The IEEE standard for floating-point calculations specifies that the result should be the same as it would be if computed exactly and then rounded using the current rounding mode. For example, in IEEE floating-point multiplication, typically an array multiplier generates partial products in carry save form, and the partial products are added to form a result. The result can be rounded as a matter of design choice, for instance to the precision of the operands or to the next higher precision.

Under the round-to-even rule, it is necessary to know whether any bit to the right of the guard bit and round bit is a one. This information can be stored in a single bit, usually called the "sticky bit." Thereafter, round-to-even includes appending the sticky bit to the right of the round bit just before rounding.

Zero detection determines whether every bit in a string of bits is a zero. Thus, zero detect generates the complement (or inverse) of the sticky bit. That is, if a string of bits contains all zero's then the zero detect flag is TRUE and the sticky bit is a zero, whereas if the string of bits contains a one (or several one's) then the zero detect flag is FALSE and the sticky bit is a one.

FIG. 1 illustrates a known circuit 100 for performing zero detection of a sum of two binary operands. N-bit operands A and B are applied to an adder, shown as a carry lookahead adder which includes PG generator 102, carry chain 104, and sum generator 106. Although other adders can be used, the carry lookahead adder provides a sum more rapidly than, for instance, a carry-ripple adder. The n-bit sum of operands A and B is provided by stages n-1, n-2, . . . 1, 0 of sum generator 106. Zero detect logic is provided by n-input OR gate 108 and inverter 110. OR gate 108 has inputs coupled to each output stage of sum generator 106. OR gate 108 outputs a logical 0 when the sum consists of zero's, and outputs a logical 1 when the sum includes any one's. Inverter 110 complements the output of OR gate 108. Thus, the output of inverter 110 provides a zero detect flag for the sum of the operands. Drawbacks to this approach include the increased fan-in of OR gate 108, and delays associated with calculating the sum and ORing each bit of the sum.

Another known technique for zero detect of a binary sum includes serially right-shifting the result, and inspecting the shifted-out bits one at a time. As soon as a shifted-out bit is detected as being a one, the zero detect flag is set to FALSE. Alternatively, if all shifted-out bits are zero's then the zero detect flag is set to TRUE. A drawback to this approach is that the right-shifting operation can be relatively time consuming, and particularly difficult to implement in a single instruction cycle.

Accordingly, there is a need for performing zero detect of a sum of binary numbers in a rapid and efficient manner.

SUMMARY OF THE INVENTION

An object of the present invention is to provide rapid and efficient zero detection of a sum of binary operands. In accordance with the invention, zero detect of a sum of binary operands can be provided by a general purpose computer in a single instruction cycle without the need for actually summing the operands.

The present invention includes a method of operating a circuit to determine whether a sum of operands is zero. In one embodiment, the method comprises the steps of providing a result representing a bit-complement of the sum, and inspecting a carry-out bit generated by incrementing the result. When the sum of the operands is zero, the bit-complement of the sum is a string of one's, and therefore incrementing the bit-complemented sum generates a carry-out bit of one. Likewise, when the sum of the operands is non-zero, the bit-complement of the sum includes one or more zero's, and incrementing the bit-complemented sum generates a carry-out bit of zero. Therefore, a zero detect flag is set to TRUE (or a sticky bit is set to zero) when the carry-out bit is a one, and the zero detect flag is set to FALSE (or the sticky bit is set to one) when the carry-out bit is a zero. The result can be provided by summing the operands and bit-complementing the sum. The result can also be provided by summing the operands and decrementing the sum. The result can also be provided by bit-complementing M operands (where M is an integer of at least two) and summing the bit-complemented operands and a constant of M-1. The carry-out bit generated by summing the bit-complemented M operands and the constant of M-1 represents a complemented carry-out bit of the sum of the M operands. Furthermore, the result can be bit-complemented to obtain the sum of the operands.

The present invention also includes a method of operating a circuit to determine whether a sum of M operands is zero, comprising the steps of bit-complementing the operands, generating a first carry-out bit from a sum of the bit-complemented operands and a constant of M-1, generating a second carry-out bit from a sum of the bit-complemented operands and a constant of M, and determining whether the first and second carry-out bits have different logical values. A zero detect flag is set to TRUE (or a sticky bit is set to zero) when the EXCLUSIVE-OR of the first and second carry-out bits is a one, and the zero detect flag is set to FALSE (or the sticky bit is set to one) when the EXCLUSIVE-OR of the first and second carry-out bits is a zero. If desired, the first carry-out bit can be complemented to provide a carry-out bit of the sum of the operands, and the sum of the bit-complemented operands and the constant of M-1 can be bit-complemented to provide the sum of the operands.

The present invention includes an apparatus for providing zero detect of a sum of binary operands, including a sum adder, inverter circuit, and carry generator in combination. The sum adder generates a sum of the operands at a sum output. The inverter circuit bit-complements the sum output. The carry generator provides a carry-out bit based on the bit-complemented sum output after it is incremented by one.

The present invention includes another apparatus for providing zero detect of a sum of M binary operands that includes a sum adder, inverter circuit, and carry generator in combination. The inverter circuit bit-complements the operands, the sum adder generates a sum of the bit-complemented operands and a constant of M-1 at a sum output, and the carry generator provides a carry-out bit based on the sum output after it is incremented by one.

The present invention also includes an apparatus for providing zero detect of a sum of binary operands, including an inverter circuit, first and second carry generators, and an inspection circuit in combination. The inverter circuit provides bit-complemented versions of M operands to the carry generators. The first carry generator generates a first carry-out bit based on a sum of the bit-complemented operands and a constant of M-1. The second carry generator generates a second carry-out bit based on a sum of the bit-complemented operands and a constant of M. The inspection circuit inspects a logical value of the first and second carry-out bits to determine whether the sum of the operands is zero. In one implementation, the first and second carry generators include carry save adders that receive the bit-complemented operands from the inverter circuit and a constant of M-1, propagate-generate sections coupled to the carry save adders, and respective first and second carry chains in which the first carry chain has a carry-in bit set to zero and the second carry chain has a carry-in bit set to one. If desired, the first carry chain can include a sum generator with an output coupled to another inverter circuit for generating a sum of the operands. In another implementation, the first and second carry generators include first, second and third rows of carry save adders, with the third row of carry save adders receiving the bit-complemented operands from the inverter circuit and the constant of M-1, the first row of carry save adders coupled to the third row for generating the first carry-out bit, and the second row of carry save adders coupled to the third row for generating the second carry-out bit.

These and other objects, features and advantages of the invention will be further described and more readily apparent from a review of the detailed description of the preferred embodiments which follow.

BRIEF DESCRIPTION OF THE DRAWINGS

In the drawings, which are not necessarily drawn to scale, in which like reference characters indicate like parts.

DETAILED DESCRIPTION OF THE PREFERRED EMBODIMENTS

Zero detection of a sum of binary operands can be accomplished by providing a result representing a bit-complement of the sum, and inspecting a carry-out bit generated by incrementing the result. The carry-out bit is a one when the result is a string of one's, otherwise the carry-out bit is a zero. Furthermore, the result is a string of one's only if the sum of the binary operands is a string of zero's. Therefore, the carry-out bit generated by incrementing the result is a one only if the sum of the operands is zero. Accordingly, a zero detect flag can be set to TRUE when the carry-out bit is a one, and set to FALSE when the carry-out bit is a zero. Similarly, a sticky bit can be set to zero when the carry-out bit is a one, and set to one when the carry-out bit is a zero.

Zero detection of a sum of binary operands can also be accomplished by generating a first carry-out bit of a first result representing a bit-complement of the sum ($\overline{S}$), generating a second carry-out bit of a second result representing a bit-complement of the sum incremented by one ($\overline{S+1}$), and determining whether the first carry-out bit and the second carry-out bit have different logical values (i.e., 01 or 10) or the same logical value (i.e., 00 or 11). The first and second carry-out bits will have different logical values when the first result is a string of one's and the second result is a string of zero's. Accordingly, a zero detect flag can be set to TRUE when the EXCLUSIVE-OR of the first carry-out bit and the second carry-out bit is a one, and otherwise set to FALSE. Similarly, a sticky bit can be set to zero when the EXCLUSIVE-OR of the first carry-out bit and the second carry-out bit is a one, and otherwise set to one.

Preferably, the binary operands are n-bit operands (treating a 1-bit carry-in operand as an n-bit operand with n-1 leading zero's), and the carry-out bits are from the most significant bit position of an associated n-bit sum or result. If desired, the binary operands can be portions of larger operands (such as portions to the right of guard bits and round bits). Furthermore, the binary operands can have various representations including unsigned, sign/magnitude, 1's complement and 2's complement.

Figure 1:
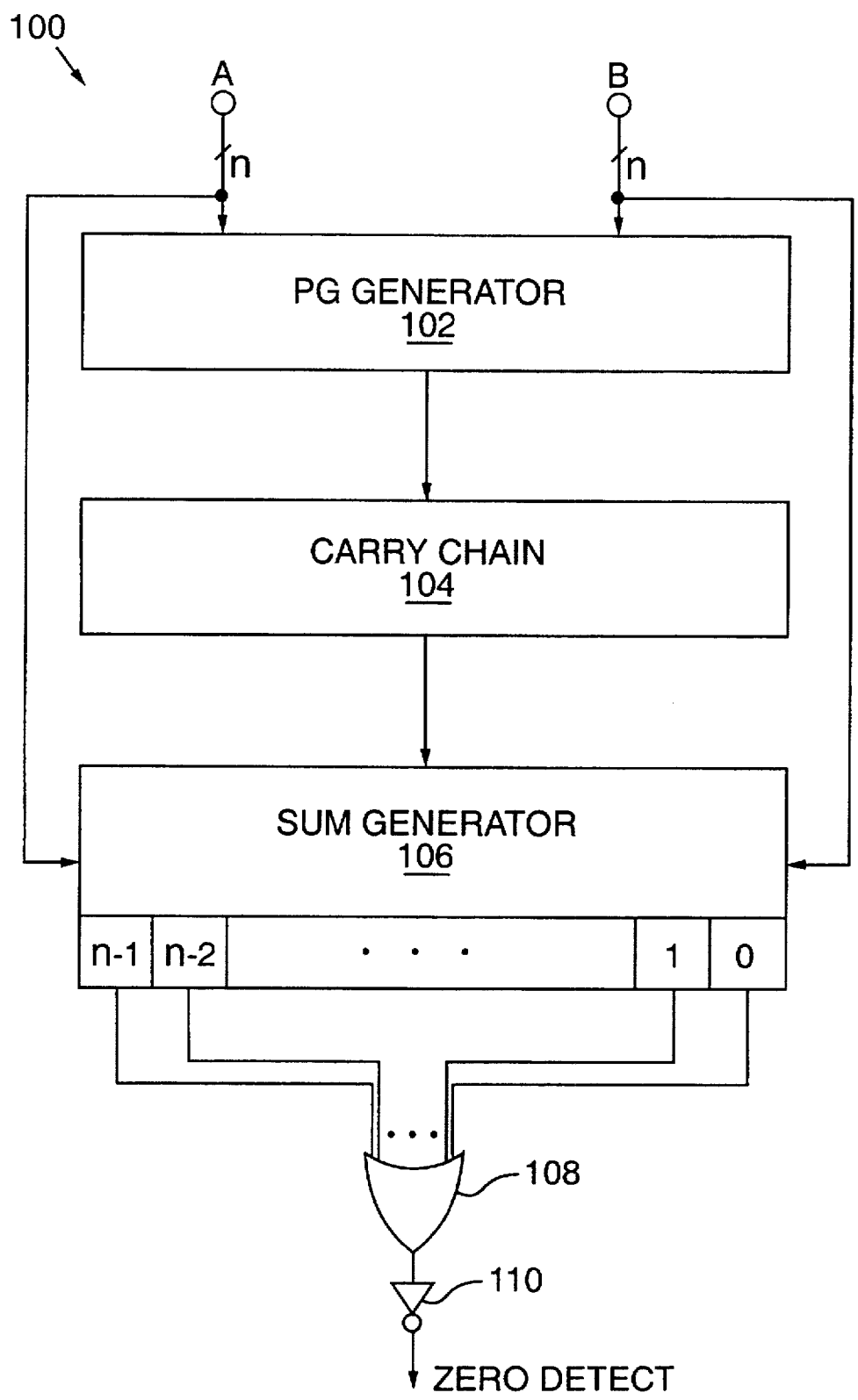
FIG. 1 is a block diagram of a known zero detection circuit.
Figure 2:
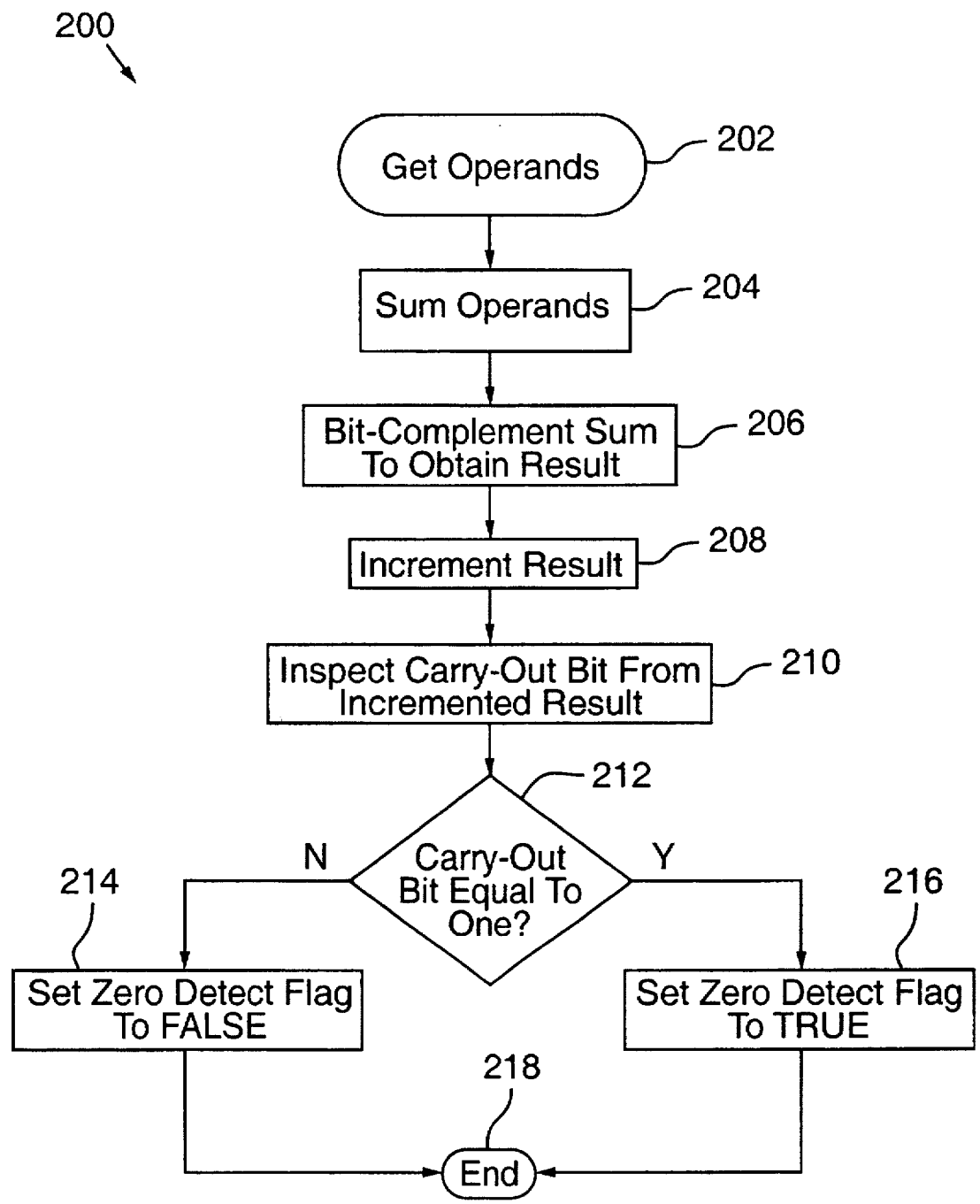
FIGS. 2 through 9 are flow charts of algorithms used to perform zero detect in accordance with embodiments of the invention.

FIG. 2 is a flow chart of algorithm 200 in accordance with one aspect of the invention. At step 202, the binary operands are obtained. At step 204, the binary operands are summed and the carry-out bit is discarded. At step 206, the sum of the binary operands is bit-complemented to obtain a result. At step 208, the result is incremented. At step 210, the carry-out bit from the incremented result is inspected. If the carry-out bit from the incremented result is a one, decision step 212 branches to step 216 where the zero detect flag is set to TRUE and the algorithm terminates at step 218. If the carry-out bit from the incremented result is a zero, decision step 212 branches to step 214 where the zero detect flag is set to FALSE and the algorithm terminates at step 218.

Figure 3:
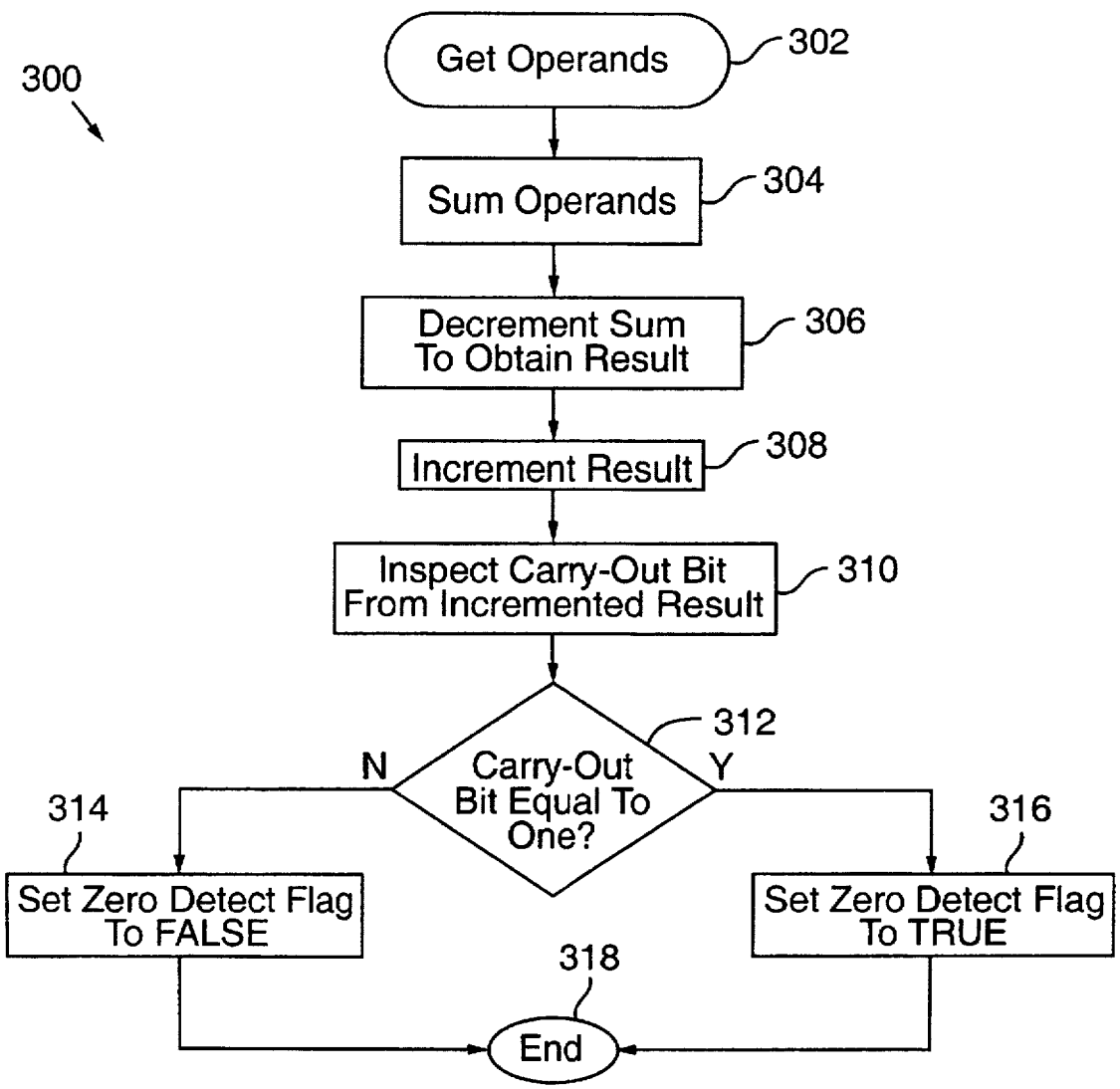

FIG. 3 is a flow chart of algorithm 300 in accordance with another aspect of the invention. At step 302, the binary operands are obtained. At step 304, the binary operands are summed and the carry-out bit is discarded. At step 306, the sum of the binary operands is decremented to obtain a result. At step 308, the result is incremented. At step 310, a carry-out bit from the incremented result is inspected. If the carry-out bit from the incremented result is a one, decision step 312 branches to step 316 where the zero detect flag is set to TRUE and the algorithm terminates at step 318. If the carry-out bit from the incremented result is a zero, decision step 312 branches to step 314 where the zero detect flag is set to FALSE and the algorithm terminates at step 318.

Figure 4:
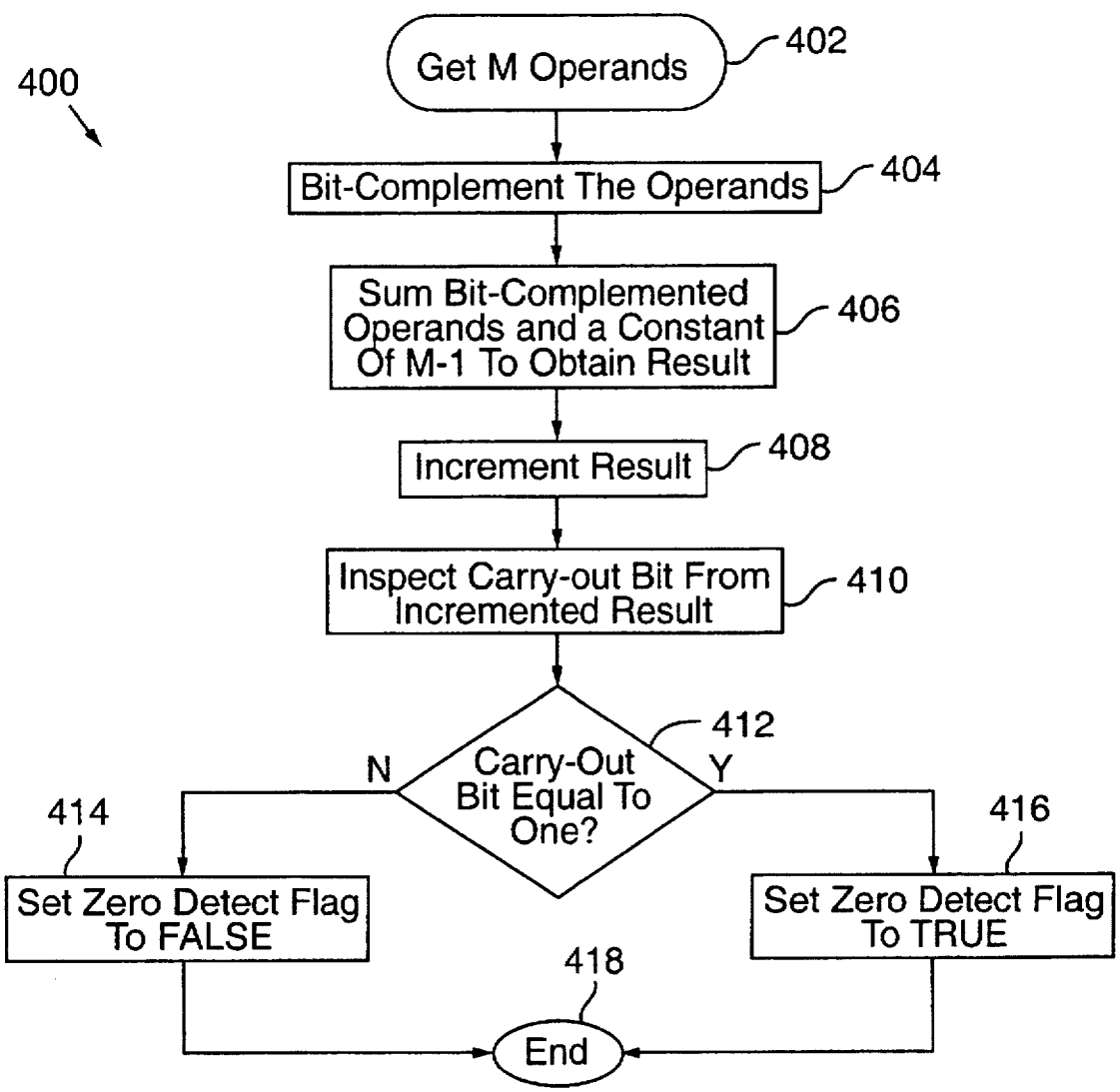

FIG. 4 is a flow chart of algorithm 400 in accordance with another aspect of the invention. At step 402, M binary operands are obtained. At step 404, the M operands are bit-complemented. At step 406, the bit-complemented operands and a constant of M-1 are summed to obtain a result, and the carry-out bit is discarded. At step 408, the result is incremented. At step 410, a carry-out bit from the incremented result is inspected. If the carry-out bit of the incremented result is a one, decision step 412 branches to step 416 where the zero detect flag is set to TRUE and the algorithm terminates at step 418. If the carry-out bit of the incremented result is a zero, decision step 412 branches to step 414 where the zero detect flag is set to FALSE and the algorithm terminates at step 418.

Figure 5:
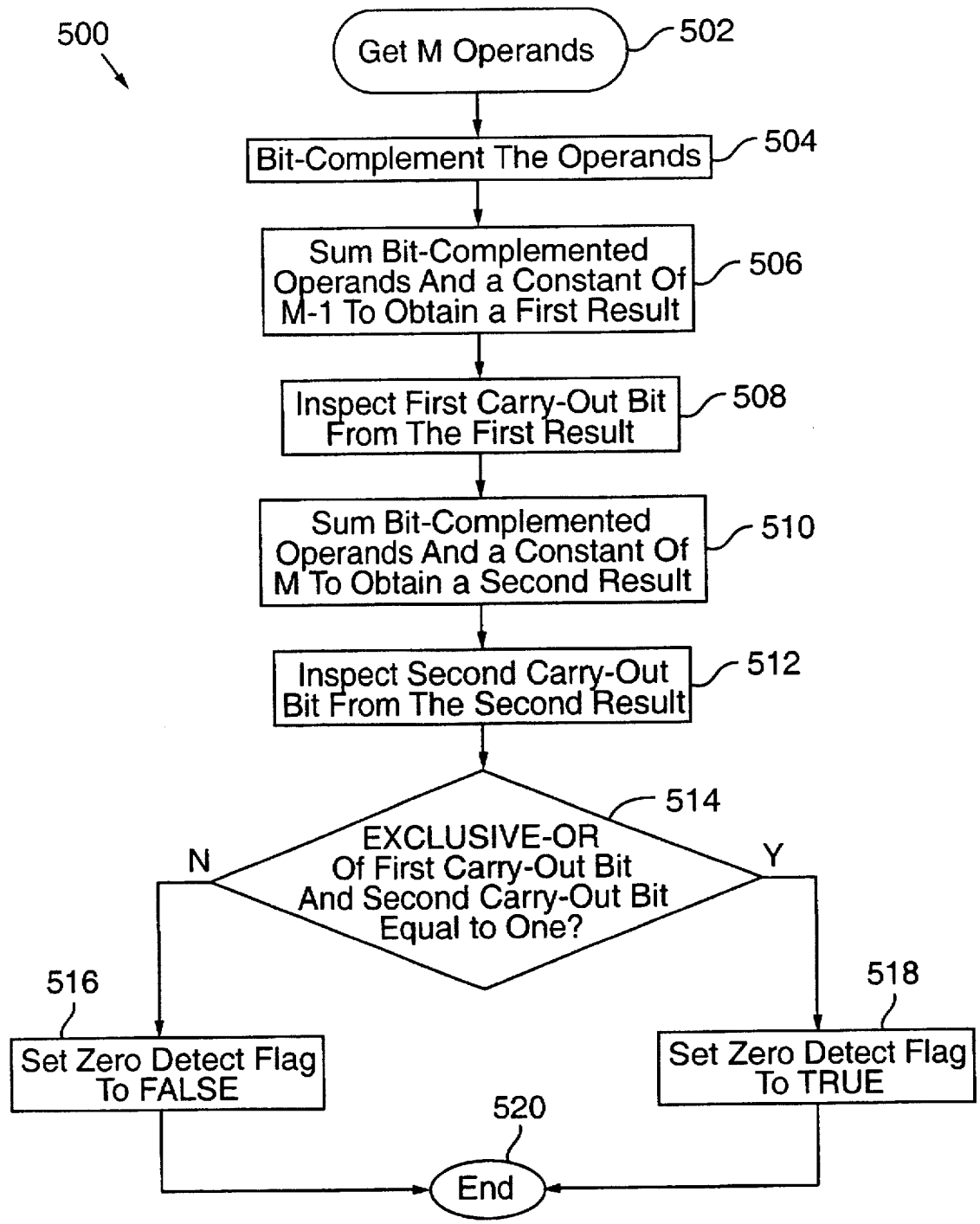

FIG. 5 is a flow chart of algorithm 500 in accordance with another aspect of the invention. At step 502, M binary operands are obtained. At step 504, the M operands are bit-complemented. At step 506, the bit-complemented operands and a constant of M-1 are summed to obtain a first result. At step 508, a first carry-out bit from the first result is inspected. At step 510, the bit-complemented operands and a constant of M are summed to obtain a second result. At step 512, a second carry-out bit from the second result is inspected. If the EXCLUSIVE-OR of the first carry-out bit and the second carry-out bit is a one, decision step 514 branches to step 518 where the zero detect flag is set to TRUE and the algorithm terminates at step 520. If the EXCLUSIVE-OR of the first carry-out bit and the second carry-out bit is a zero, decision step 514 branches to step 516 where the zero detect flag is set to FALSE and the algorithm terminates at step 520.

Figure 6:
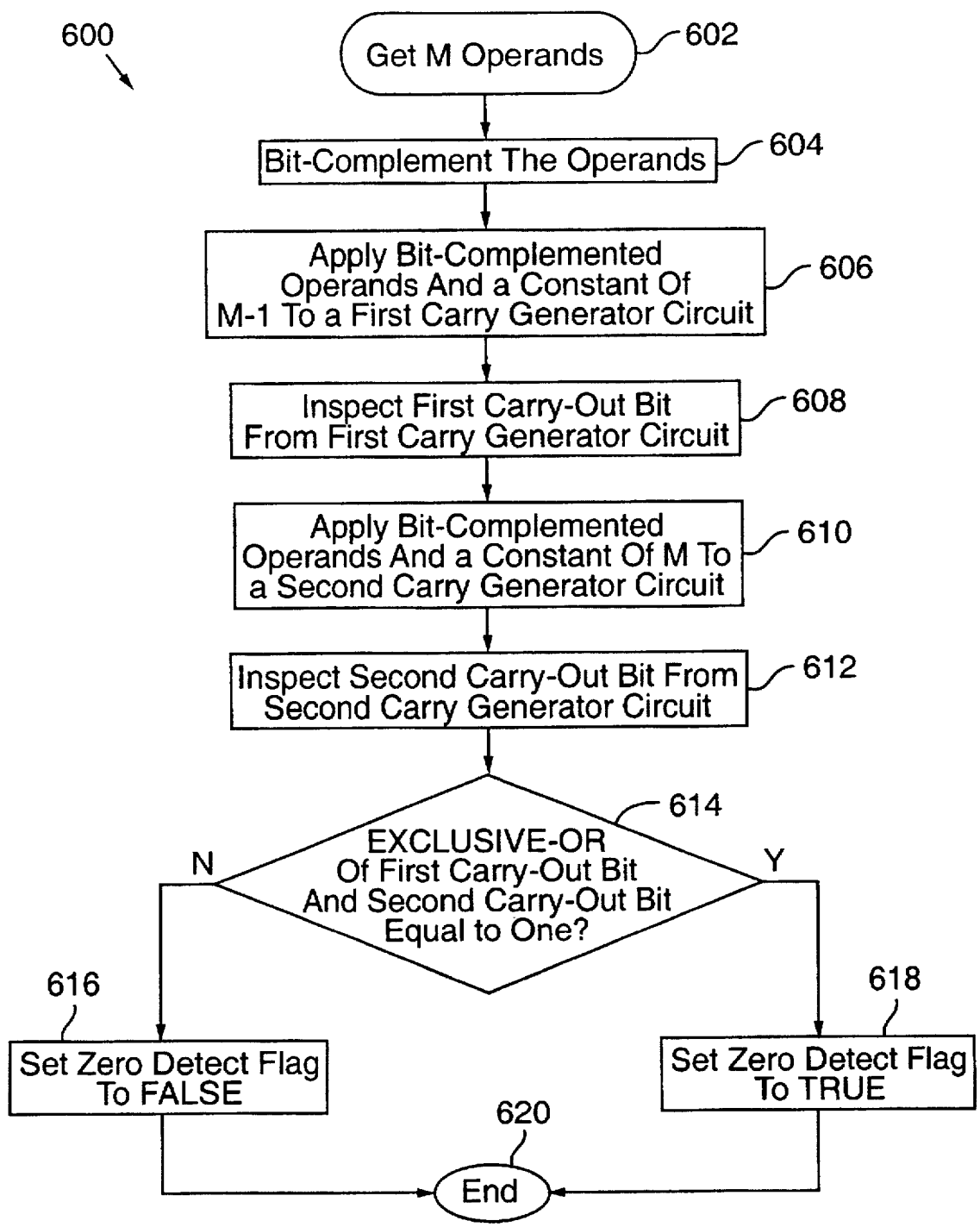

FIG. 6 is a flow chart of algorithm 600 in accordance with another aspect of the invention. At step 602, M binary operands are obtained. At step 604, the M operands are bit-complemented. At step 606, the bit-complemented operands and a constant of M-1 are applied to a first carry generator. The first carry generator generates a first carry-out bit of a sum of the bit-complemented operands and the constant M-1 without actually calculating the sum. At step 608, the first carry-out bit from the first carry generator is inspected. At step 610, the bit-complemented operands and a constant of M are applied to a second carry generator. The second carry generator generates a second carry-out bit of a sum of the bit-complemented operands and the constant M without actually calculating the sum. At step 612, the second carry-out bit from the second carry generator is inspected. If the EXCLUSIVE-OR of the first carry-out bit and the second carry-out bit is a one, decision step 614 branches to step 618 where the zero detect flag is set to TRUE and the algorithm terminates at step 620. If the EXCLUSIVE-OR of the first carry-out bit and the second carry-out bit is a zero, decision step 614 branches to step 616 where the zero detect flag is set to FALSE and the algorithm terminates at step 620.

Figure 7:
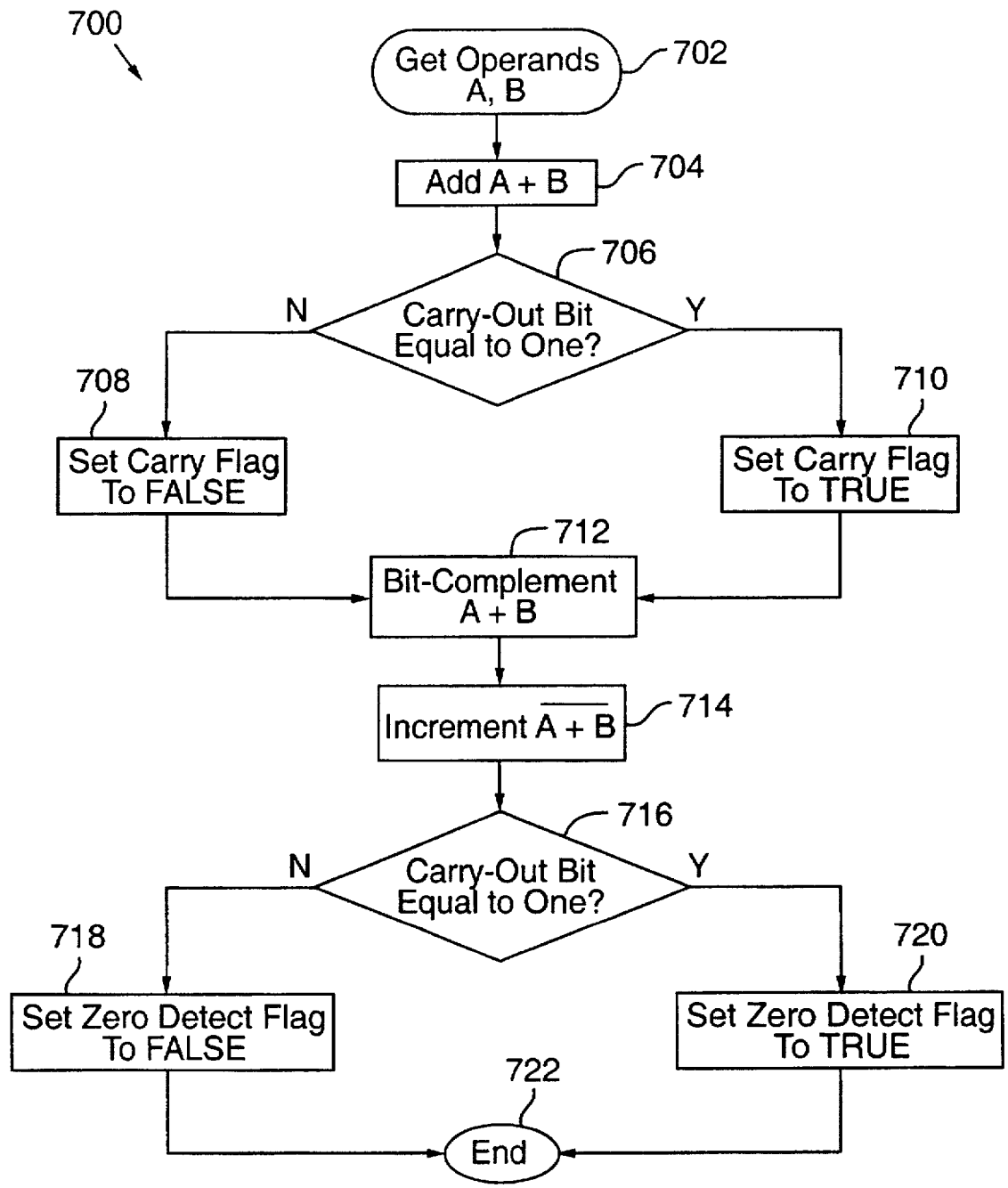

FIG. 7 is a flow chart of algorithm 700 in accordance with another aspect of the invention. Algorithm 700 provides an example of algorithm 200. At step 702, binary operands A and B are obtained. At step 704, operands A and B are summed to provide A+B. At decision step 706, if the carry-out bit of the sum A+B is a one then at step 710 the carry flag is set to TRUE and the algorithm proceeds to step 712, whereas if the carry-out bit is a zero then at step 708 the carry flag is set to FALSE and the algorithm proceeds to step 712. Thereafter, the carry-out bit of the sum of A+B is discarded. At step 712, the sum A+B is bit-complemented to obtain $\overline{A+B}$, and at step 714 $\overline{A+B}$ is incremented to provide $(\overline{A+B})+1$. Step 716 tests whether the carry-out bit of $(\overline{A+B})+1$ is equal to one. If so, at step 720 the zero detect flag is set to TRUE and the algorithm terminates at step 722, otherwise at step 718 the zero detect flag is set to FALSE and the algorithm terminates at step 722.

Figure 8:
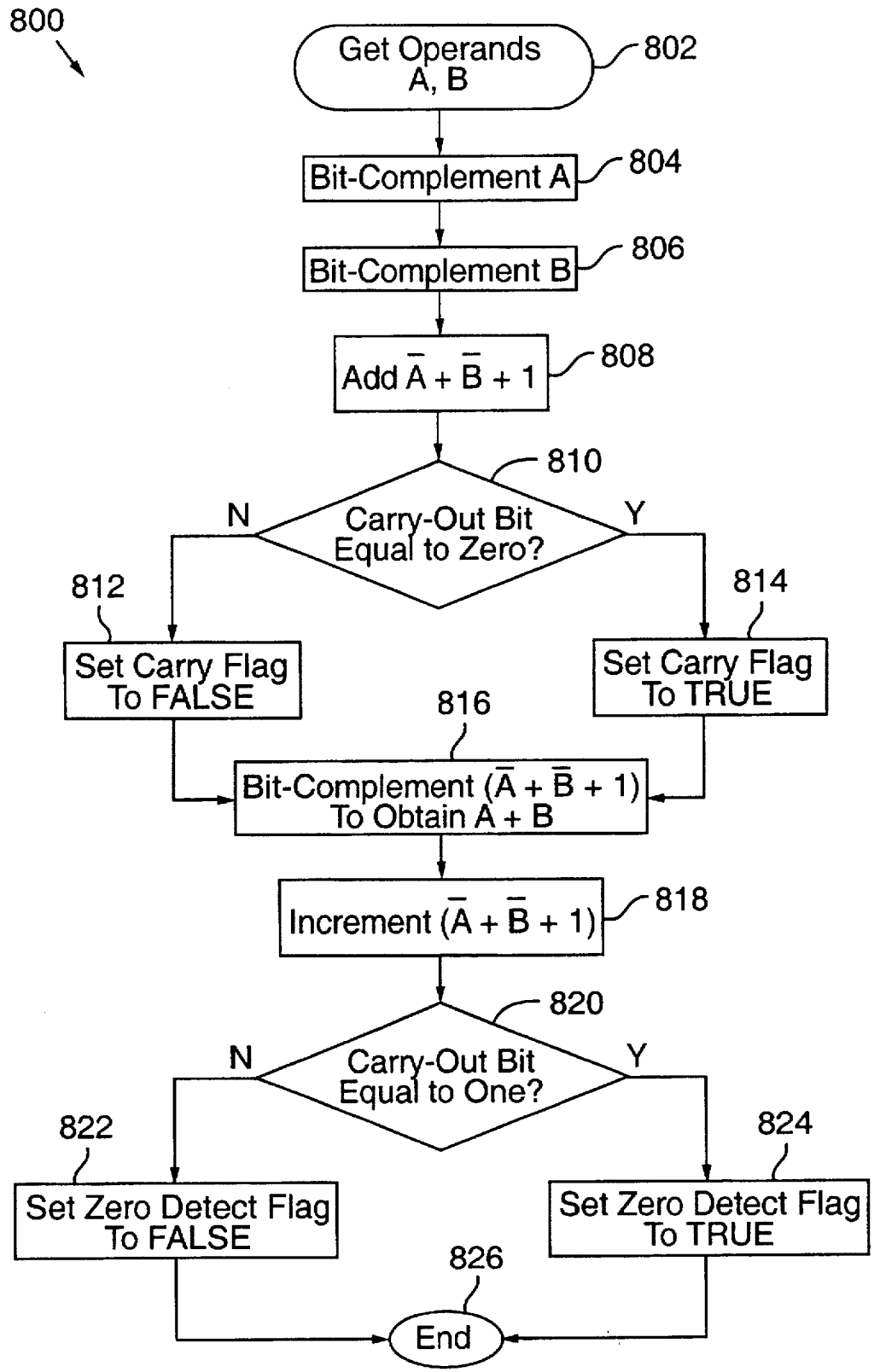

FIG. 8 is a flow chart of algorithm 800 in accordance with another aspect of the invention. Algorithm 800 provides an example of algorithm 400. At step 802, binary operands A and B are obtained. At step 804 the A operand is bit-complemented to obtain $\overline{A}$, and at step 806 the B operand is bit-complemented to obtain $\overline{B}$. At step 808, the bit-complemented operands $\overline{A}$ and $\overline{B}$ and one are added. Decision step 810 then tests whether the carry-out bit from the sum $\overline{A}+\overline{B}+1$ is a zero. If so, the carry flag is set to TRUE at step 814 and the algorithm proceeds to step 816. If not, the carry flag is set to FALSE at step 812 and the algorithm proceeds to step 816. Thereafter, the carry-out bit of the sum $\overline{A}+\overline{B}+1$ is discarded. At step 816, the sum $\overline{A}+\overline{B}+1$ is bit-complemented to obtain the sum of A and B. At step 818, the sum $\overline{A}+\overline{B}+1$ is incremented to provide $(\overline{A}+\overline{B}+1)+1$. Decision step 820 then tests whether the carry-out bit of $(\overline{A}+\overline{B}+1)+1$ is a one. If so, the zero detect flag is set to TRUE at step 824 and the algorithm ends at step 826, otherwise the zero detect flag is set to FALSE at step 822 and the algorithm ends at step 826.

Figure 9:
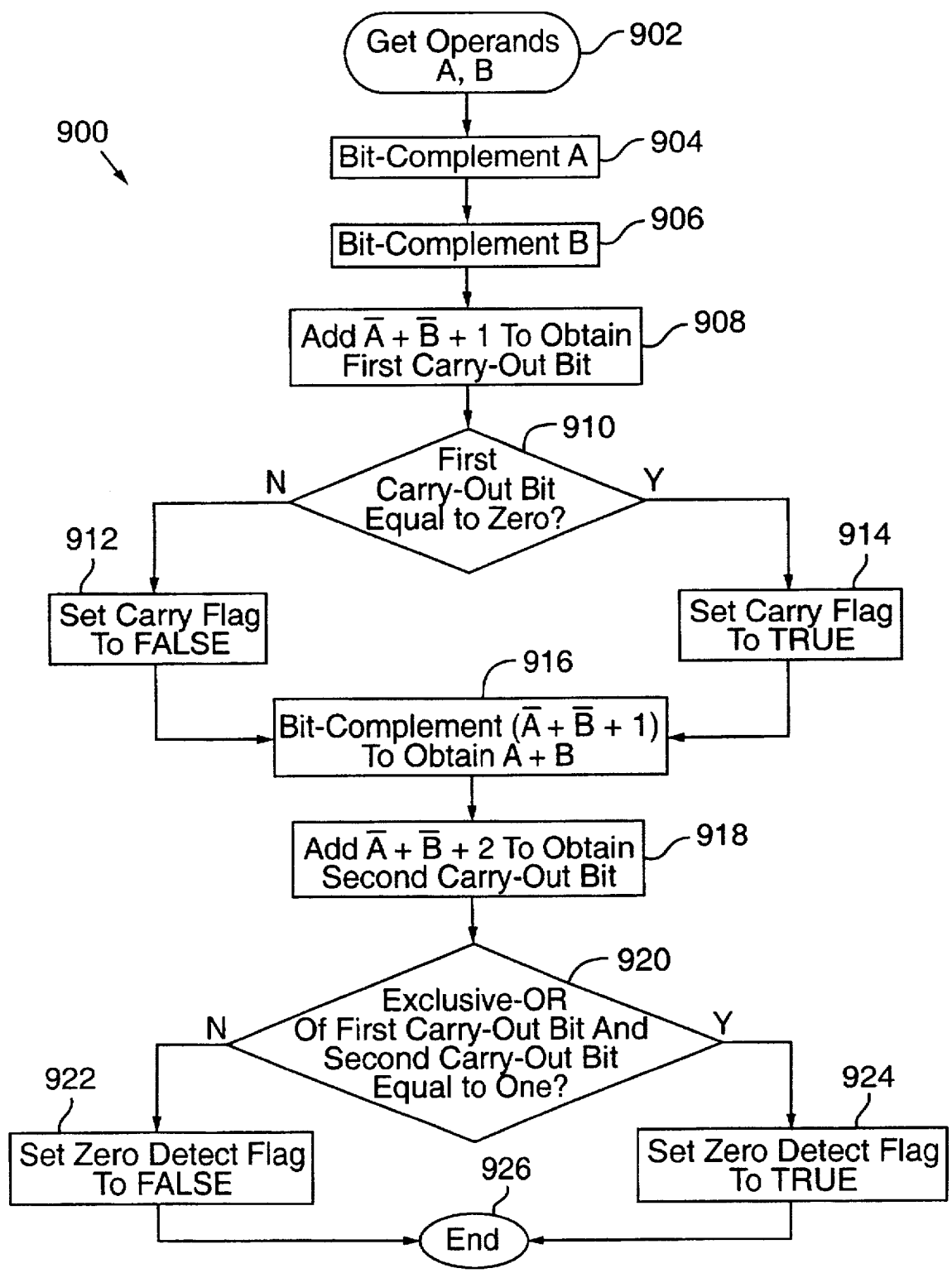

FIG. 9 is a flow chart of algorithm 900 in accordance with another aspect of the invention. Algorithm 900 provides an example of algorithm 500. At step 902, binary operands A and B are obtained. At step 904 the A operand is bit-complemented to obtain $\overline{A}$, and at step 906 the B operand is bit-complemented to obtain $\overline{B}$. At step 908, the bit-complemented operands $\overline{A}$ and $\overline{B}$ and one are added to obtain a first carry-out bit. Decision step 910 then tests whether the first carry-out bit of the sum $\overline{A}+\overline{B}+1$ is a zero. If so, the carry flag is set to TRUE at step 914 and the algorithm proceeds to step 916. If not, the carry flag is set to FALSE at step 912 and the algorithm proceeds to step 916. At step 916, the sum $\overline{A}+\overline{B}+1$ is bit-complemented to obtain the sum of A and B. At step 918, $\overline{A}$ and $\overline{B}$ and two are added to obtain a second carry-out bit. Decision step 920 then tests whether the EXCLUSIVE-OR of the first carry-out bit from $\overline{A}+\overline{B}+1$ and the second carry-out bit from $\overline{A}+\overline{B}+2$ is a one. If so, the zero detect flag is set to TRUE at step 924 and the algorithm ends at step 926, otherwise the zero detect flag is set to FALSE at step 922 and the algorithm ends at step 926.

In algorithms 200, 300, 400, 700 and 800, various numbers are summed to obtain a result, the carry-out bit of the result is discarded, and then another carry-out bit generated by incrementing the result (that is, adding one to the result) is inspected to determine zero detect. While these approaches are efficient in terms of hardware utilization, the sequential summing and incrementing steps may require separate instruction cycles or present other time delays. In algorithms 500, 600 and 900, the first and second carry-out bits are generated concurrently, thereby expediting the operation and facilitating implementation in a single instruction cycle.

Variations to algorithm 200 through 900 are apparent. For instance, setting the carry flag in algorithms 700, 800 and 900 is optional, calculating the sum of the operands in algorithms 800 and 900 is optional, and the sum of the operands can be calculated in algorithms 400, 500 and 600. A sticky bit would merely be the complement of the zero detect flag. The operands, when bit-complemented, can be bit-complemented in any order or simultaneously. Likewise, when the first and second carry-out bits are generated, they can be generated in any order or simultaneously. Furthermore, when the first and second carry-out bits are generated, the numbers need not be actually added, for instance by use of PG generator sections and carry chains without sum generators.

The present invention is perhaps best understood by considering some of the underlying mathematics. Consider zero detect for a sum of two n-bit binary operands A and B. If A+B is equal to zero then the sum is an n-bit string of zero's. As a result, the bit-complement of A+B, or $\overline{A+B}$, is an n-bit string of one's. Incrementing an n-bit string of one's produces an n-bit string of zero's and a carry-out bit of one from the most significant bit position. Likewise, incrementing an n-bit string which contains any zero's will generate a carry-out bit of zero from the most significant bit position. Therefore, zero detect can be determined by incrementing $\overline{A+B}$ and inspecting the carry-out bit for the most significant bit position of the n-bit incremented result. This can be accomplished by summing A and B, discarding the carry-out bit, bit-complementing the result, incrementing the bit-complemented result, and inspecting the carry-out bit generated by the incrementing. A disadvantage to this approach, however, is that the zero detect is delayed by the sum then increment sequence. The present invention also provides for a more rapid approach for zero detect. Consider the following algebraic manipulations:

$$\overline{A+B} = -(A+B)-1 \quad (1)$$

$$\overline{A+B} = -A+-B-1 \quad (2)$$

$$\overline{A+B} = (\overline{A}+1)+(\overline{B}+1)-1 \quad (3)$$

$$\overline{A+B} = \overline{A}+\overline{B}+1 \quad (4)$$

In accordance with expression (4), zero detect for the sum of A+B can be determined by inspecting the carry-out bit generated by incrementing $\overline{A}+\overline{B}+1$. Likewise, zero detect for the sum of A+B can be determined by inspecting the EXCLUSIVE-OR of the carry-out bit for $\overline{A}+\overline{B}+1$ and the carry-out bit for $\overline{A}+\overline{B}+2$. Furthermore, by appropriate use of a PG generator and carry chains, the carry-out bits for $\overline{A}+\overline{B}+1$ and for $\overline{A}+\overline{B}+2$ can be determined concurrently without actually summing the numbers, thereby eliminating the need for sum generators. This provides for a rapid zero detect (and/or sticky bit detect) operation.

If a binary result is bit-complemented, then the carry-out bit is also complemented. Therefore, the bit-complement of A+B, or $\overline{A+B}$, generates a carry-out bit corresponding to a complemented carry-out bit of A+B. Thus, in accordance with expression (4), carry detect for A+B occurs when $\overline{A}+\overline{B}+1$ generates a carry-out bit set to zero. Furthermore, by appropriate use of a PG generator and carry chains, the carry-out bit for $\overline{A}+\overline{B}+1$ can be determined without actually summing the numbers, so that the sum generator can be eliminated. This provides for a rapid carry detect operation.

Consider zero detect for a sum of three n-bit binary operands A and B and C. If A+B+C is equal to zero then the sum is an n-bit string of zero's. As a result, the bit-complement of A+B+C, or $\overline{A+B+C}$, is an n-bit string of one's. As with the two operand case, zero detect can be determined by incrementing $\overline{A+B+C}$ and inspecting the carry-out bit for the most significant bit position of the n-bit incremented result. This can be accomplished by summing A and B and C, discarding the carry-out bit, bit-complementing the result, incrementing the bit-complemented result, and inspecting the carry-out bit generated by the incrementing. As with the two operand case, zero detect is delayed by the sum then increment sequence. Consider the following algebraic manipulations:

$$\overline{A+B+C} = -(A+B+C)-1 \quad (5)$$

$$\overline{A+B+C} = -A+-B+-C-1 \quad (6)$$

$$\overline{A+B+C} = (\overline{A}+1)+(\overline{B}+1)+(\overline{C}+1)-1 \quad (7)$$

$$\overline{A+B+C} = \overline{A}+\overline{B}+\overline{C}+2 \quad (8)$$

In accordance with expression (8), zero detect for the sum of A+B+C can be determined by inspecting the carry-out bit generated by incrementing $\overline{A}+\overline{B}+\overline{C}+2$. Likewise, zero detect for the sum of A+B+C can be determined by inspecting the EXCLUSIVE-OR of the carry-out bit for $\overline{A}+\overline{B}+\overline{C}+2$ and the carry-out bit for $\overline{A}+\overline{B}+\overline{C}+3$. Furthermore, by appropriate use of a PG generator and carry chains, the carry-out bits for $\overline{A}+\overline{B}+\overline{C}+2$ and for $\overline{A}+\overline{B}+\overline{C}+3$ can be determined concurrently without actually summing the numbers. That is, since only the carry-out bits are needed, the sum generators can be eliminated. This provides for a rapid zero detect (and/or sticky bit detect) and rapid carry detect operation.

When the sum of M operands is zero, often the first carry-out bit will be a zero and the second carry-out bit will be a one, although in some instances the first carry-out bit will be a one and the second carry-out bit will be a zero. Consider two n-bit binary operands A and B. Suppose the operands are non-zero and the n-bit sum of the operands is zero. In this case, a carry-out bit of one is generated from the MSB position of the sum (A+B), the n-bit sum of the bit-complemented operands plus one ($\overline{A}+\overline{B}+1$, which is equivalent to $\overline{A+B}$) is an n-bit string of one's which generates a carry-out bit of zero from the MSB position of the sum, and the n-bit sum of the bit-complemented operands plus two ($\overline{A}+\overline{B}+2$, which is equivalent to $\overline{A+B}+1$) is an n-bit string of zero's which generates a carry-out bit of one from the MSB position of the sum. Thus, the first carry-out bit is a zero and the second carry-out bit is a one. Now suppose the operands are both zero. In this case, the n-bit sum of the operands must be zero and generate a carry-out bit of zero from the MSB position of the sum, the n-bit sum of the bit-complemented operands plus one is an n-bit string of one's which generates a carry-out bit of one from the MSB position of the sum, and the n-bit sum of the bit-complemented operands plus two is an n-bit string of zero's which generates a carry-out bit of zero from the MSB position of the sum and another carry-out bit of one from the MSB+1 position of the sum. Thus, the first carry-out bit is a one, the second carry-out bit is a zero, and the carry-out bit from the MSB+1 position is discarded. In both cases where the sum of the operands is zero, the first and second carry-out bits always have different logical values. Furthermore, when the sum of the operands is non-zero, the n-bit sum of the bit-complemented operands plus one contains at least one zero, the n-bit sum of the bit-complemented operands plus two is equivalent to adding one to a string with at least one zero which does not change the carry-out bit from the MSB position, and therefore the first and second carry-out bits have the same logical value. Accordingly, the EXCLUSIVE-OR of the first and second carry-out bits provides zero detect.

Based on the foregoing, it is proposed that for M operands, zero detect for the sum of the operands can be provided by determining whether the carry-out bit generated by incrementing the sum of the bit-complemented M operands and a constant of M-1 is a one. Likewise, zero detect for the sum of the M operands can be provided by determining whether the EXCLUSIVE-OR of the carry-out bit for the sum of the bit-complemented M operands and a constant of M-1, and the carry-out bit for the sum of the bit-complemented M operands and a constant of M, is a one.

Various examples of binary operands applied to algorithm 700 are listed below in Table 1. The operands are summed, and the carry-out bit of the sum is inspected. The sum of the operands is bit-complemented, and then incremented by one. In summary, if the carry-out bit from the incremented sum is a one then set the zero detect flag to TRUE, otherwise set the zero detect flag to FALSE. In algorithm 700, the two carry-out bits are generated sequentially. The carry-out bit of A+B in column 2 obviously provides carry detect for A+B, but is not used for zero detect. The carry-out bit of $(\overline{A+B})+1$ in columns 4 and 5 indicates an overflow condition for a string of one's, and therefore provides zero detect, but is not used for carry detect of A+B.

TABLE 1

ZERO DETECT OF TWO OPERANDS USING ALGORITHM 700

| Operands A and B | Add A + B | Complement $\overline{A + B}$ | Increment $\overline{A + B}$ | Carry-Out Bit of $(\overline{A + B}) + 1$ | Zero Detect Flag |
|---|---|---|---|---|---|
| 1001 0111 | 1001 + 0111 | 0000 ↓ | 1111 + 0001 | One | True |
| | 1 0000 | 1111 | 1 0000 | | |
| 1101 0001 | 1101 + 0001 | 1110 ↓ | 0001 + 0001 | Zero | False |
| | 1 1110 | 0001 | 0 0010 | | |
| 0000 0001 | 0000 + 0001 | 0001 ↓ | 1110 + 0001 | Zero | False |
| | 0 0001 | 1110 | 0 1111 | | |
| 0010 1110 | 0010 + 1110 | 0000 ↓ | 1111 + 0001 | One | True |
| | 10000 | 1111 | 1 0000 | | |
| 0000 0000 | 0000 + 0000 | 0000 ↓ | 1111 + 0001 | One | True |
| | 0 0000 | 1111 | 1 0000 | | |

Various examples of binary operands applied to algorithm 800 are listed below in Table 2. The bit-complemented operands and one are added, and a carry-out bit is inspected to determine the complemented carry-out bit for the sum of the operands. The some of the bit-complemented operands and one is bit-complemented to obtain the sum of the operands. The sum of the bit-complemented operands and one is also incremented. In summary, if the carry-out bit from the incremented sum is a one then set the zero detect flag to TRUE, otherwise set the zero detect flag to FALSE. In algorithm 800, the two carry-out bits are generated sequentially. The carry-out bit of $\overline{A}+\overline{B}+1$ in column 2 can be inverted to provide carry detect for A+B, but is not used for zero detect. The carry-out bit of $(\overline{A}+\overline{B}+1)+1$ columns 4 and 5 indicates an overflow condition for a string of one's, and therefore provides zero detect, but is not used for carry detect of A+B.

TABLE 2

ZERO DETECT OF TWO OPERANDS USING ALGORITHM 800

| Op-erands A and B | Add $\overline{A} + \overline{B}$ + 1 | Complement $\overline{A} + \overline{B} + 1$ (A + B) | Increment $\overline{A} + \overline{B} + 1$ | Carry-Out Bit of $(\overline{A} + \overline{B} + 1) + 1$ | Zero Detect Flag |
|---|---|---|---|---|---|
| 1001 0111 | 0110 1000 | 1111 ↓ | 1111 + 0001 | One | True |
| | + 0001 | 0000 | 1 0000 | | |
| 1101 0001 | 0 1111 0010 1110 | 0001 ↓ | 0001 + 0001 | Zero | False |
| | + 0001 | 1110 | 0 0010 | | |
| 0000 0001 | 1 0001 1111 1110 | 1110 ↓ | 1110 + 0001 | Zero | False |
| | + 0001 | 0001 | 0 1111 | | |
| 0010 1110 | 1 1110 1101 0001 | 1111 ↓ | 1111 + 0001 | One | True |
| | + 0001 | 0000 | 1 0000 | | |
| 0000 0000 | 0 1111 1111 1111 | 1111 ↓ | 1111 + 0001 | One | True |
| | + 0001 | 0000 | 1 0000 | | |
| | 1 1111 | | | | |

Various examples of binary operands applied to algorithm 900 are listed below in Table 3. The bit-complemented operands and one are added, and a first carry-out bit is inspected initially to determine the complemented carry-out bit for the sum of the operands. The sum of the bit-complemented operands and one is bit-complemented to determine the sum of the operands. Furthermore, the bit-complemented operands and two are added, and a second carry-out bit is inspected. In summary, if the EXCLUSIVE-OR of the first carry-out bit is a one then set the zero detect flag to TRUE, otherwise set the zero detect flag to FALSE. In algorithm 900, the two carry-out bits are generated concurrently. The first carry-out bit of $\overline{A}+\overline{B}+1$ in columns 2 and 3 can be inverted to provide carry detect for A+B. The second carry-out bit of $\overline{A}+\overline{B}+2$ in columns 5 and 6 is not used for carry detect. However, both the first and second carry-out bits are inspected to indicate an overflow condition for a string of one's, and therefore provide zero detect.

TABLE 3

ZERO DETECT OF TWO OPERANDS USING ALGORITHM 900

| Operands A and B | Add $\bar{A} + \bar{B} + 1$ | First Carry-Out Bit | Complement $\overline{\bar{A} + \bar{B} + 1}$ $(A + B)$ | Add $\bar{A} + \bar{B} + 2$ | Second Carry-Out Bit | Zero Detect Flag |
|---|---|---|---|---|---|---|
| 1001 0111 | 0110 1000 + 0001 | Zero | 1111 ↓ 0000 | 0110 1000 + 0010 | One | True |
| 1101 0001 | 0 1111 0010 1110 + 0001 | One | 0001 ↓ 1110 | 1 0000 0010 1110 + 0010 | One | False |
| 0000 0001 | 1 0001 1111 1110 + 0001 | One | 1110 ↓ 0001 | 1 0010 1111 1110 + 0010 | One | False |
| 0010 1110 | 1 1110 1101 0001 + 0001 | Zero | 1111 ↓ 0000 | 1 1111 1101 0001 + 0010 | One | True |
| 0101 1110 | 0 1111 1010 0001 + 0001 | Zero | 1100 ↓ 0011 | 1 0000 1010 0001 + 0010 | Zero | False |
| 0000 0000 | 0 1100 1111 1111 + 0001 | One | 1111 ↓ 0000 | 01101 1111 1111 + 0010 | Zero | True |
| | 1 1111 | | | 10 0000 | | |

It should be noted that in the last example in Table 3, where the binary operands are both zero, the second carry-out bit generated from the most significant bit position of the associated four-bit sum is a zero, although another carry-out bit generated from the MSB+1 bit position is a one.

Figure 10:
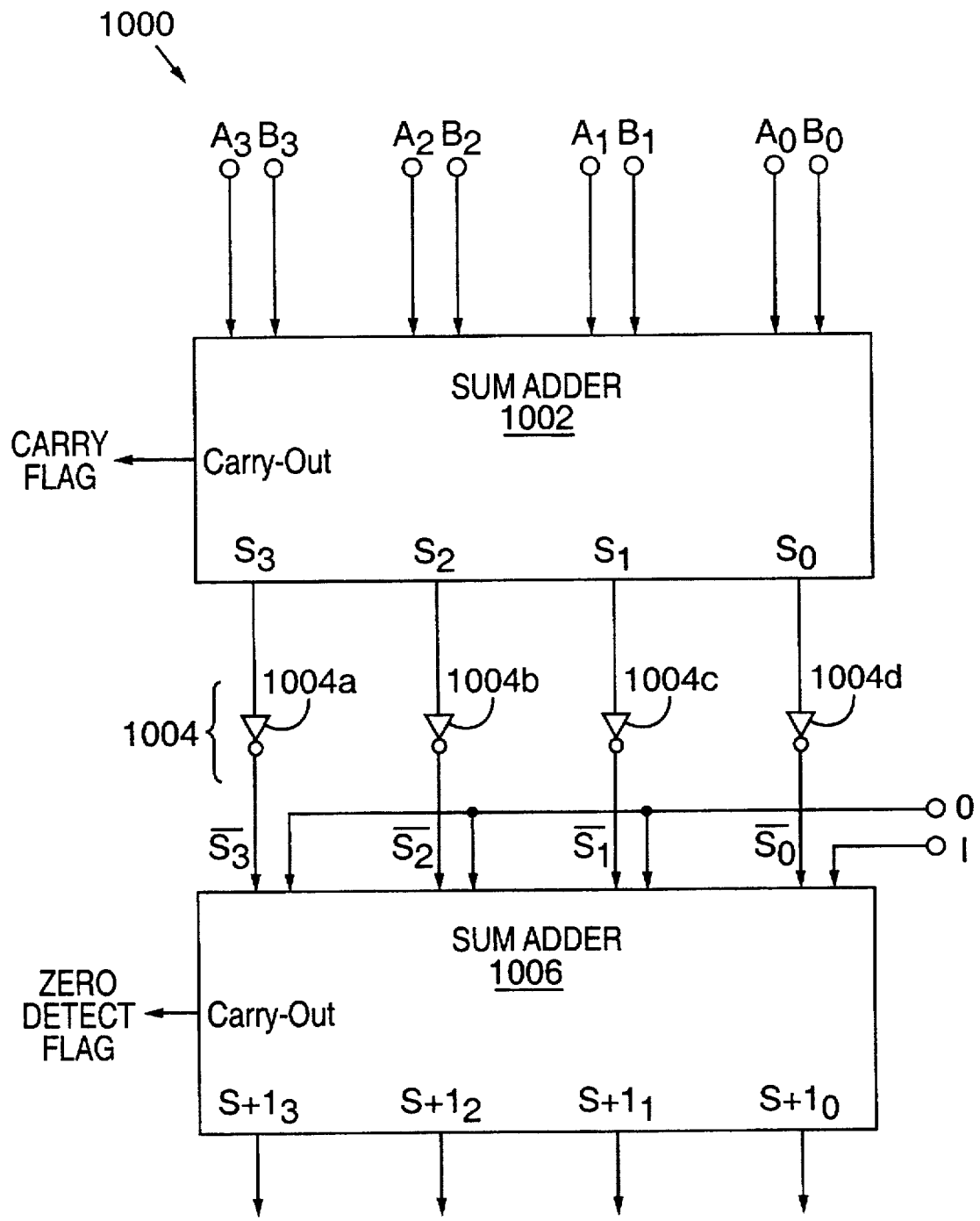
FIG. 10 is a block diagram of a logic circuit for performing zero detect in accordance with an embodiment of the invention.

FIG. 10 is a block diagram of a logic circuit 1000 for zero detection of a sum of two four-bit binary operands A and B in accordance with algorithm 700. Sum adder 1002 has operand inputs coupled to the A and B operands, such that bits $A_3$ and $B_3$ are applied to stage 3 of adder 1002, bits $A_2$ and $B_2$ are applied to stage 2 of adder 1002, bits $A_1$ and $B_1$ are applied to stage 1 of adder 1002, and bits $A_0$ and $B_0$ are applied to stage 0 of adder 1002. Accordingly, sum adder 1002 generates a sum output consisting of bits $S_3$, $S_2$, $S_1$ and $S_0$, and a carry-out bit. The carry-out bit of sum adder 1002 can be used to set a carry flag for the sum of the A and B operands. Inverter circuit 1004 bit-complements the sum output. Inverter circuit 1004 includes inverters 1004a, 1004b, 1004c and 1004d. Bit $S_3$ is applied to inverter 1004a, bit $S_2$ is applied to inverter 1004b, bit $S_1$ is applied to inverter 1004c, and bit $S_0$ is applied to inverter 1004d. Inverters 1004a, 1004b, 1004c and 1004d generate respective bit-complemented sum output bits $\bar{S}_3$, $\bar{S}_2$, $\bar{S}_1$ and $\bar{S}_0$. Sum adder 1006 has a first operand input coupled to inverter circuit 1004, and a second operand input coupled to a binary one. Bit $\bar{S}_3$ and a logical 0 are applied to stage 3 of sum adder 1006, bit $\bar{S}_2$ and a logical 0 are applied to stage 2 of sum adder 1006, bit $\bar{S}_1$ and a logical 0 are applied to stage 1 of sum adder 1006, and bit $\bar{S}_0$ and a logical 1 are applied to stage 0 of sum adder 1006. Accordingly, sum adder 1006 generates a sum-plus-one output consisting of bits $S+1_3$, $S+1_2$, $S+1_1$ and $S+1_0$, and a carry-out bit. The carry-out bit of sum adder 1006 provides a zero detect flag. When the carry-out bit is a one the zero detect flag is TRUE, and when the carry-out bit is a zero the zero detect flag is FALSE.

The present invention includes numerous variations to logic circuit 1000. For instance, logic circuit 1000 can accommodate n-bit operands by providing sum adders 1002 and 1006 with n stages, and providing inverter circuit 1004 with n inverters. Furthermore, if the sum-plus-one output is not desired, then sum adder 1006 can be replaced by a carry generator containing a PG generator coupled to a carry chain. Logic circuit 1000 can implement algorithm 200 for M operands by providing sum adder 1002 with M operand inputs. Logic circuit 1000 can implement algorithm 300 for M operands by providing sum adder 1002 with M operand inputs, and by replacing inverter circuit 1004 with a decrement circuit that decrements the sum output of sum adder 1002. Logic circuit 1000 can implement algorithm 400 for M operands by providing M inverter circuits for bit-complementing the M operands, providing sum adder 1002 with M operand inputs for receiving the M bit-complemented operands and an additional input for receiving a constant of M-1, and replacing inverter circuit 1004 with non-inverting interconnections. Logic circuit 1000 can implement algorithm 800 by providing first and second inverter circuits for bit-complementing the A and B operands, replacing sum adder 1002 with a sum-plus-one adder, applying $\bar{A}$ and $\bar{B}$ to the sum-plus-one adder, providing a third inverter circuit to bit-complement the sum-plus-one output to obtain the sum of A and B, and providing another inverter to complement the carry-out bit of the sum-plus-one adder to set the carry flag. Of course, the output of sum adder 1006 can be inverted to provide a sticky bit.

A drawback to logic circuit 1000, and the variations thereof, is that the sum output and the carry-out bit for setting the zero detect flag cannot be generated concurrently. That is, the carry-out bit for setting the zero detect flag must wait for the sum output to be generated before it can be determined. The delay associated with first generating the sum output and then generating the carry-out bit for the zero detect flag may prevent the operation from occurring in a single instruction cycle.

Figure 11:
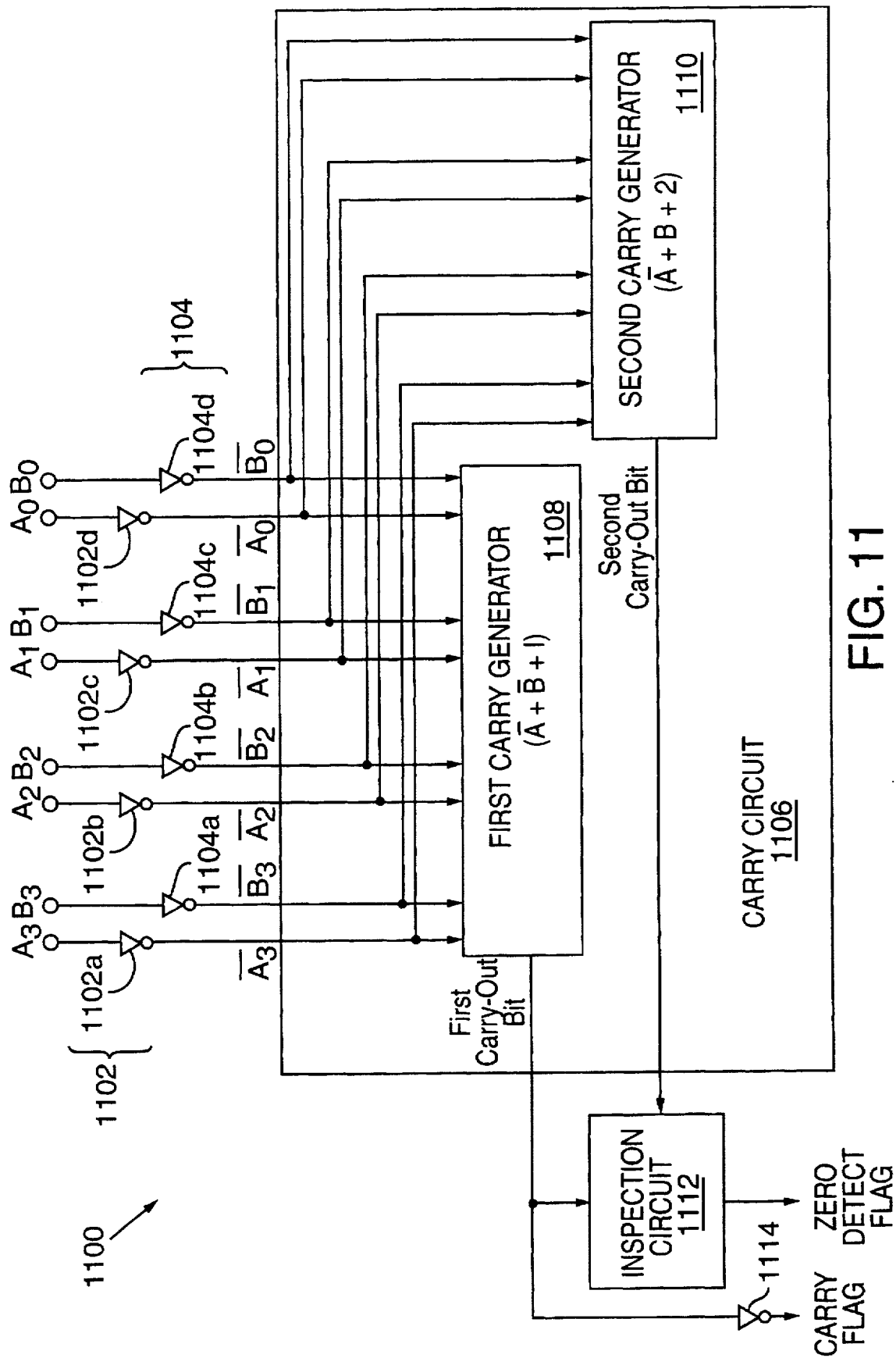
FIG. 11 is a block diagram of another logic circuit for performing zero detect in accordance with an embodiment of the invention.

FIG. 11 is a block diagram of a logic circuit 1100 for zero detection of a sum of two four-bit binary operands A and B in accordance with another embodiment of the invention. First inverter circuit 1102 has an operand input coupled to the A operand to provide a bit-complemented A operand at its output, and second inverter circuit 1104 has an operand input coupled to the B operand to provide a bit-complemented B operand at its output. More particularly, first inverter circuit 1102 includes inverters 1102a, 1102b, 1102c and 1102d, and second inverter circuit 1104 includes inverters 1104a, 1104b, 1104c and 1104d. Operand A has bit $A_3$ applied to inverter 1102a, bit $A_2$ applied to inverter 1102b, bit $A_1$ applied to inverter 1102c, and bit $A_0$ applied to inverter 1102d, such that inverters 1102a, 1102b, 1102c and 1102d output bits $\overline{A}_3$, $\overline{A}_2$, $\overline{A}_1$, and $\overline{A}_0$, respectively. Similarly, operand B has bit $B_3$ applied to inverter 1104a, bit $B_2$ applied to inverter 1104b, bit $B_1$ applied to inverter 1104c, and bit $B_0$ applied to inverter 1104d, such that inverters 1104a, 1104b, 1104c and 1104d output bits $\overline{B}_3$, $\overline{B}_2$, $\overline{B}_1$ and $\overline{B}_0$, respectively.

Carry circuit 1106 receives $\overline{A}$ and $\overline{B}$ at its operand inputs. In particular, bits $\overline{A}_3$ and $\overline{B}_3$ are applied to stage 3 of carry circuit 1106, bits $\overline{A}_2$ and $\overline{B}_2$ are applied to stage 2 of carry circuit 1106, and bits $\overline{A}_1$ and $\overline{B}_1$ are applied to stage 1 of carry circuit 1106, and bits $\overline{A}_0$ and $\overline{B}_0$ are applied to stage 0 of carry circuit 1106. Carry circuit 1106 includes first carry generator 1108 and second carry generator 1110. First carry generator 1108 provides a first carry-out bit corresponding to the carry-out bit from the most significant bit position (stage 3) of the sum of $\overline{A}$ plus $\overline{B}$ plus one. Similarly, second carry generator 1110 provides a second carry-out bit corresponding to the carry-out bit from the most significant bit position (stage 3) of the sum of $\overline{A}$ plus $\overline{B}$ plus two. Inspection circuit 1112 receives the first and second carry-out bits from carry circuit 1106, outputs a logical one (thereby setting the zero detect flag to TRUE) if the first carry-out bit and the second carry-out bit have different logical values, and outputs a logical zero (thereby setting the zero detect flag to FALSE) if the first carry-out bit and the second carry-out bit have the same logical value. Preferably, inspection circuit 1112 is implemented by an EXCLUSIVE-OR gate that receives the first and second carry-in bits, and outputs the zero detect flag. Inverter 1114 receives the first carry-out bit from carry circuit 1106, outputs a logical one (thereby setting the carry flag to TRUE) if the first carry-out bit is a zero, and outputs a logical zero (thereby setting the carry flag to FALSE) if the first carry-out bit is a one. Thus, the outputs of inspection circuit 1112 and inverter 1114 constitute the outputs of logic circuit 1100. Advantageously, first carry generator 1108 and second carry generator 1110 can determine the first and second carry-out bits concurrently, thereby providing for rapid zero detect.

The present invention includes numerous variations to logic circuit 1100. For instance, logic circuit 1100 can accommodate n-bit operands by providing inverter circuits 1102 and 1104 each with n inverters, and providing carry circuit 1106 with n stages. Furthermore, if a sum of the operands is desired, then carry circuit 1106 can include a sum generator coupled to the first carry generator, and a third inverter circuit coupled to the output of the sum generator. As another approach to generate the sum of the operands, the first carry generator can be replaced by a sum-plus-one adder that receives $\overline{A}$ and $\overline{B}$ as operand inputs, with the sum-plus-one output coupled to the third inverter circuit. Logic circuit 1100 can implement algorithm 500 for M operands by providing carry circuit 1106 with M operand inputs, replacing first carry generator 1108 with a sum adder that sums the bit-complemented M operands and a constant of M-1, and using second carry generator 1110 to generate the second carry-out bit for the sum of the bit-complemented M operands and a constant of M. Similarly, logic circuit 1100 can implement algorithm 600 for M operands by providing carry circuit 1106 with M operand inputs, using first carry generator 1108 to generate the first carry-out bit for the sum of the bit-complemented M operands and a constant of M-1, and using second carry generator 1110 to generate the second carry-out bit for the sum of the bit-complemented M operands and a constant of M. Logic circuit 1100 can implement algorithm 900 by including a third inverter circuit for bit-complementing the sum of $\overline{A}$ and $\overline{B}$ and one to provide the sum of A and B. Inverter 1114 is not needed for zero detect. Of course, the output of inspection circuit 1112 can be inverted to provide a sticky bit.

Figure 12:
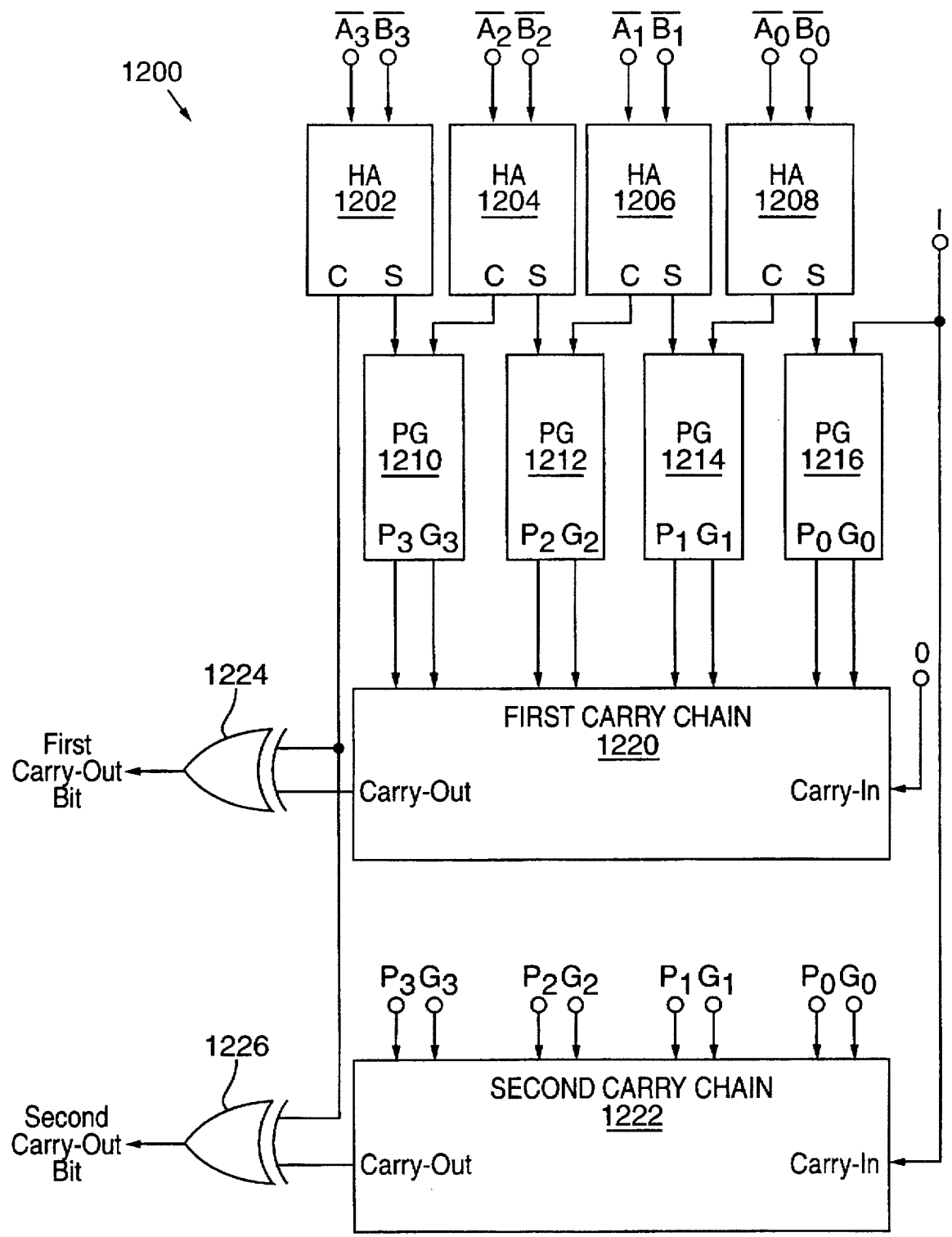
FIGS. 12–14 are block diagrams of carry circuits suitable for use in the logic circuit of FIG. 11.

FIG. 12 shows an implementation for carry circuit 1106. Circuit 1200 includes half adders 1202, 1204, 1206 and 1208 for receiving $\overline{A}_3$ and $\overline{B}_3$, $\overline{A}_2$ and $\overline{B}_2$, $\overline{A}_1$ and $\overline{B}_1$, and $\overline{A}_0$ and $\overline{B}_0$, respectively. The half adders are coupled to propagate-generate (PG) sections 1210, 1212, 1214 and 1216 that provide a PG generator. In particular, the sum bit of half adder 1208 and a "1" are coupled to PG section 1216, the sum bit of half adder 1206 and the carry-out bit of half adder 1208 are coupled to PG section 1214, the sum bit of half adder 1204 and the carry-out bit of half adder 1206 are coupled to PG section 1212, and the sum bit of half adder 1202 and the carry-out bit of half adder 1204 are coupled to PG section 1210. PG sections 1210, 1212, 1214 and 1216 provide propagate and generate signals $P_3$ and $G_3$, $P_2$ and $G_2$, $P_1$ and $G_1$, and $P_0$ and $G_0$ to respective stages of first carry chain 1220 and second carry chain 1222. The propagate and generate signals and the carry-out bit from half adder 1202 correspond to the sum of $\overline{A}$ plus $\overline{B}$ plus one. First carry chain 1220 receives a "0" at its carry-in bit, and second carry chain 1222 receives a "1" at its carry-in bit. First EXCLUSIVE-OR gate 1224 receives the carry-out bit of half adder 1202 and the carry-out bit of first carry-chain 1220 at its inputs, and second EXCLUSIVE-OR gate 1226 receives the carry-out bit of half adder 1202 and the carry-out bit of second carry chain 1222 at its inputs. As a result, first EXCLUSIVE-OR gate 1224 provides the first carry-out bit, corresponding to the sum of $\overline{A}$ plus $\overline{B}$ plus one, whereas second EXCLUSIVE-OR gate 1226 provides the second carry-out bit, corresponding to the sum of $\overline{A}$ plus $\overline{B}$ plus two. In this manner, half adders 1202, 1204, 1206 and 1208, PG sections 1210, 1212, 1214 and 1216, first carry chain 1220 and first EXCLUSIVE-OR gate 1224 implement first carry generator 1108, and half adders 1202, 1204, 1206 and 1208, PG sections 1210, 1212, 1214 and 1216, second carry chain 1222 and second EXCLUSIVE-OR gate 1226 implement second carry generator 1110.

Figure 13:
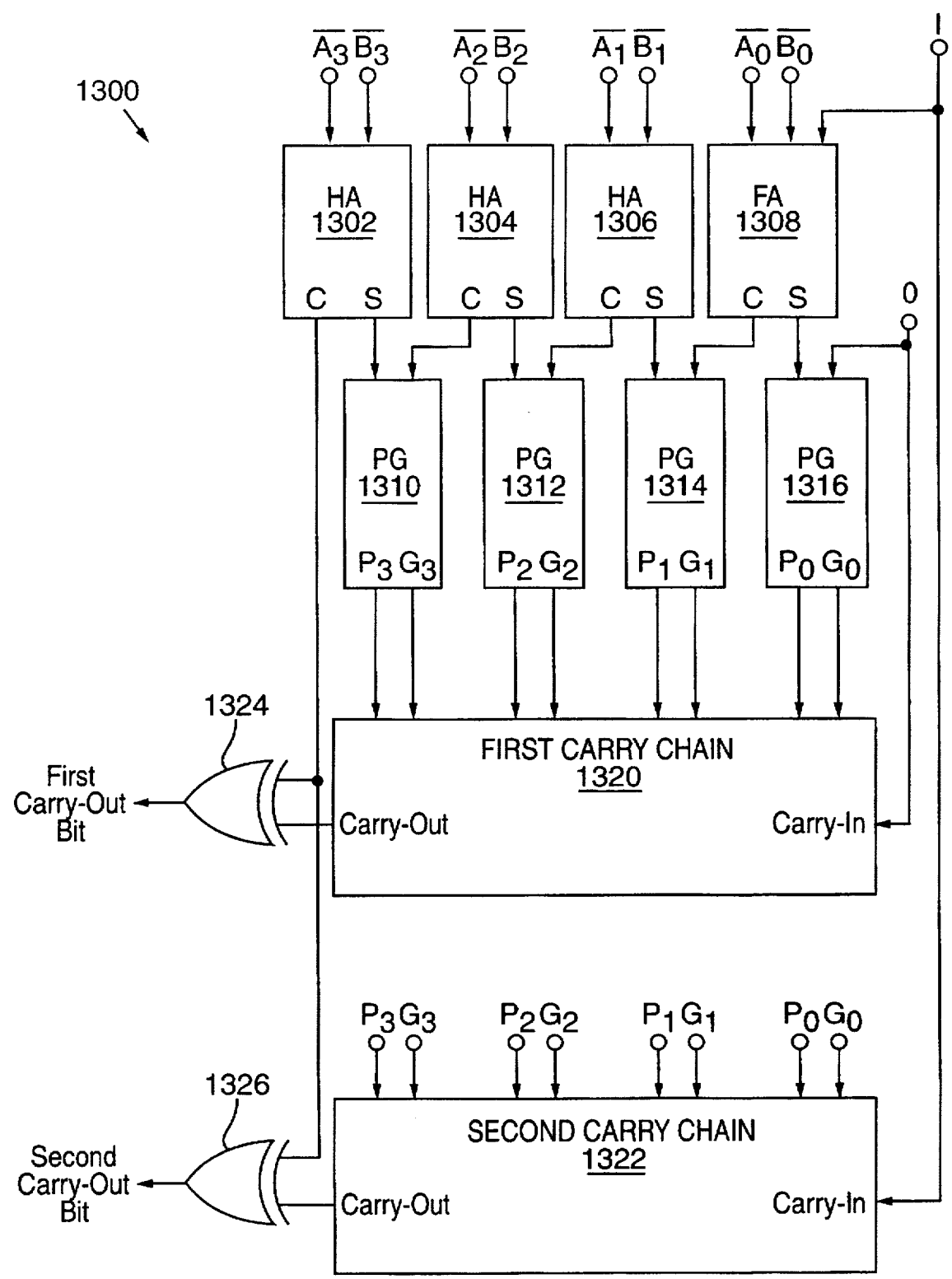

FIG. 13 shows another implementation for carry circuit 1106. Circuit 1300 is similar to circuit 1200, that is, half adder 1302 corresponds to half adder 1202, etc., except that full adder 1308, which replaces half adder 1208, receives $\overline{A}_0$ and $\overline{B}_0$ a one, and PG section 1316 receives the sum bit of full adder 1308 and a zero. Accordingly, EXCLUSIVE-OR gate 1324 provides the first carry-out bit, corresponding to the sum of $\overline{A}$ plus $\overline{B}$ plus one, whereas second EXCLUSIVE-OR gate 1326 provides the second carry-out bit, corresponding to the sum of $\overline{A}$ plus $\overline{B}$ plus two. Half adders 1302, 1304 and 1306, full adder 1308, PG sections 1310, 1312, 1314 and 1316, first carry chain 1320 and first EXCLUSIVE-OR gate 1324 implement first carry generator 1108, and half adders 1302, 25 1304 and 1306, full adder 1308, PG sections 1310, 1312, 1314 and 1316, second carry chain 1322 and second EXCLUSIVE-OR gate 1326 implement second carry generator 1110.

Figure 14:
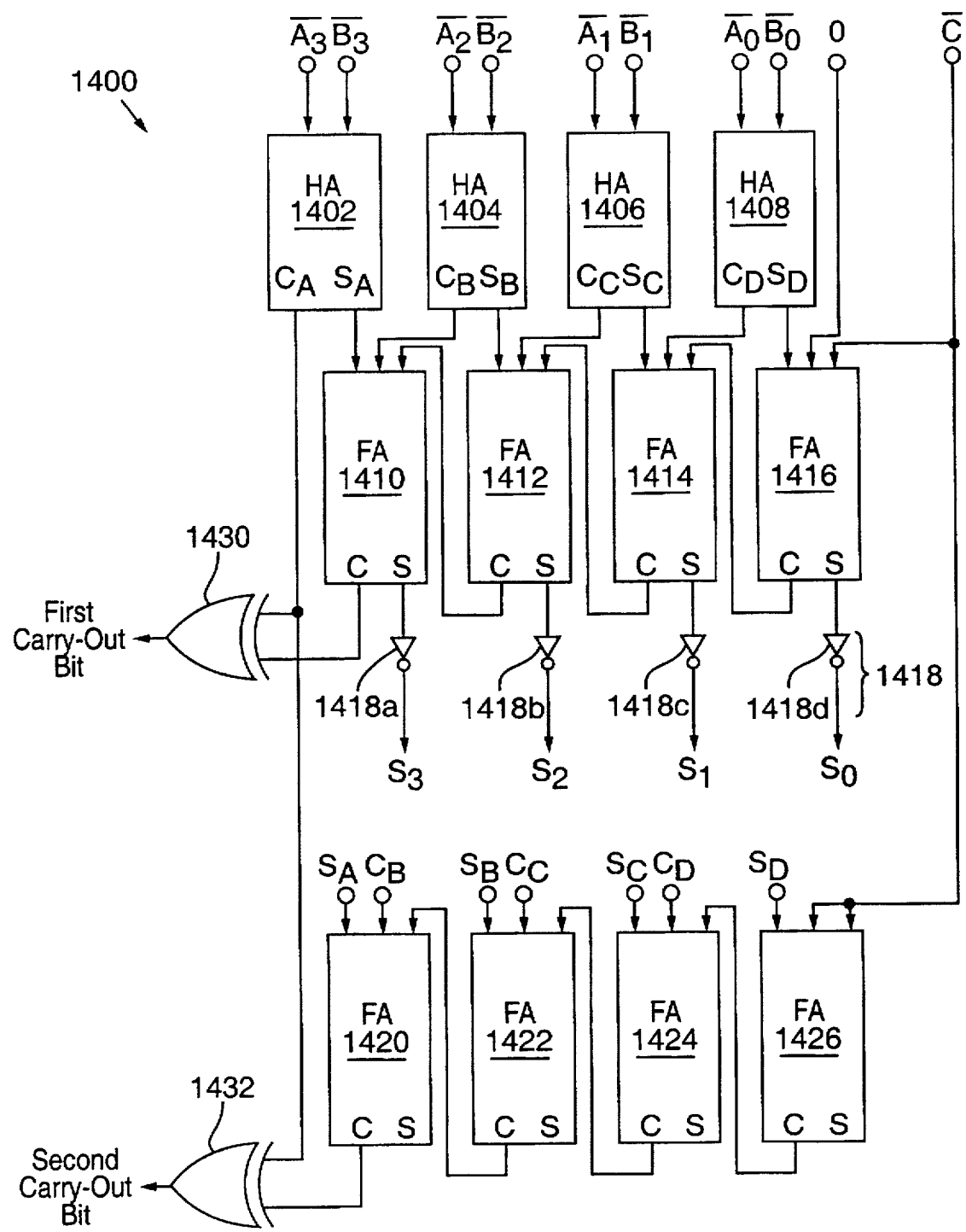

FIG. 14 shows another implementation for carry circuit 1106. Circuit 1400 includes half adders 1402, 1404, 1406, and 1408 for receiving $\overline{A}_3$ and $\overline{B}_3$, $\overline{A}_2$ and $\overline{B}_2$, $\overline{A}_1$ and $\overline{B}_1$, and $\overline{A}_0$ and $\overline{B}_0$, respectively. The half adders are coupled to a first row of full adders 1410,1412, 1414 and 1416, and a second row of full adders 1420,1422, 1424 and 1426. In particular, the sum bit ($S_D$) of half adder 1408 is coupled to full adders 1416 and 1426, the carry-out bit ($C_D$) of half adder 1408 and the sum bit ($S_C$) of half adder 1406 are coupled to full adders 1414 and 1424, the carry-out bit ($C_C$) of half adder 1406 and the sum bit ($S_B$) of half adder 1404 are coupled to full adders 1412 and 1422, and carry-out bit ($C_B$) of half adder 1404 and the sum bit ($S_A$) of half adder 1402 are coupled to full adders 1410 and 1420. The carry-out bit of full adder 1416 is applied to full adder 1414, the carry-out bit of full adder 1414 is applied to full adder 1412, and the carry-out bit of full adder 1412 is applied to full adder 1410. Likewise, the carry-out bit of full adder 1426 is applied to full adder 1424, the carry-out bit of full adder 1424 is applied to full adder 1422, and the carry-out bit of full adder 1422 is applied to full adder 1420. Full adder 1416 also receives a zero and a one, and full adder 1426 also receives a pair of one's. Finally, the carry-out bit ($C_A$) of half adder 1402 and the carry-out bit of full adder 1410 are applied to first EXCLUSIVE-OR gate 1430, and the carry-out bit ($C_A$) of half adder 1402 and the carry-out bit of full adder 1420 are applied to second EXCLUSIVE-OR gate 1432. As a result, the first row of full adders computes the sum of $\overline{A}+\overline{B}+1$, and the second row of full adders computes the sum of $\overline{A}+\overline{B}+2$. Furthermore, first EXCLUSIVE-OR gate 1430 provides the first carry-out bit, and second EXCLUSIVE-OR gate 1432 provides the second carry-out bit.

Although not essential to zero detect, circuit 1400 also provides the sum of A and B. The sum of A and B is provided at the output of inverter circuit 1418, consisting of inverters 1418a, 1418b, 1418c and 1418d coupled to the sum bits of full adders 1410, 1412, 1414 and 1416, respectively.

Figure 15:
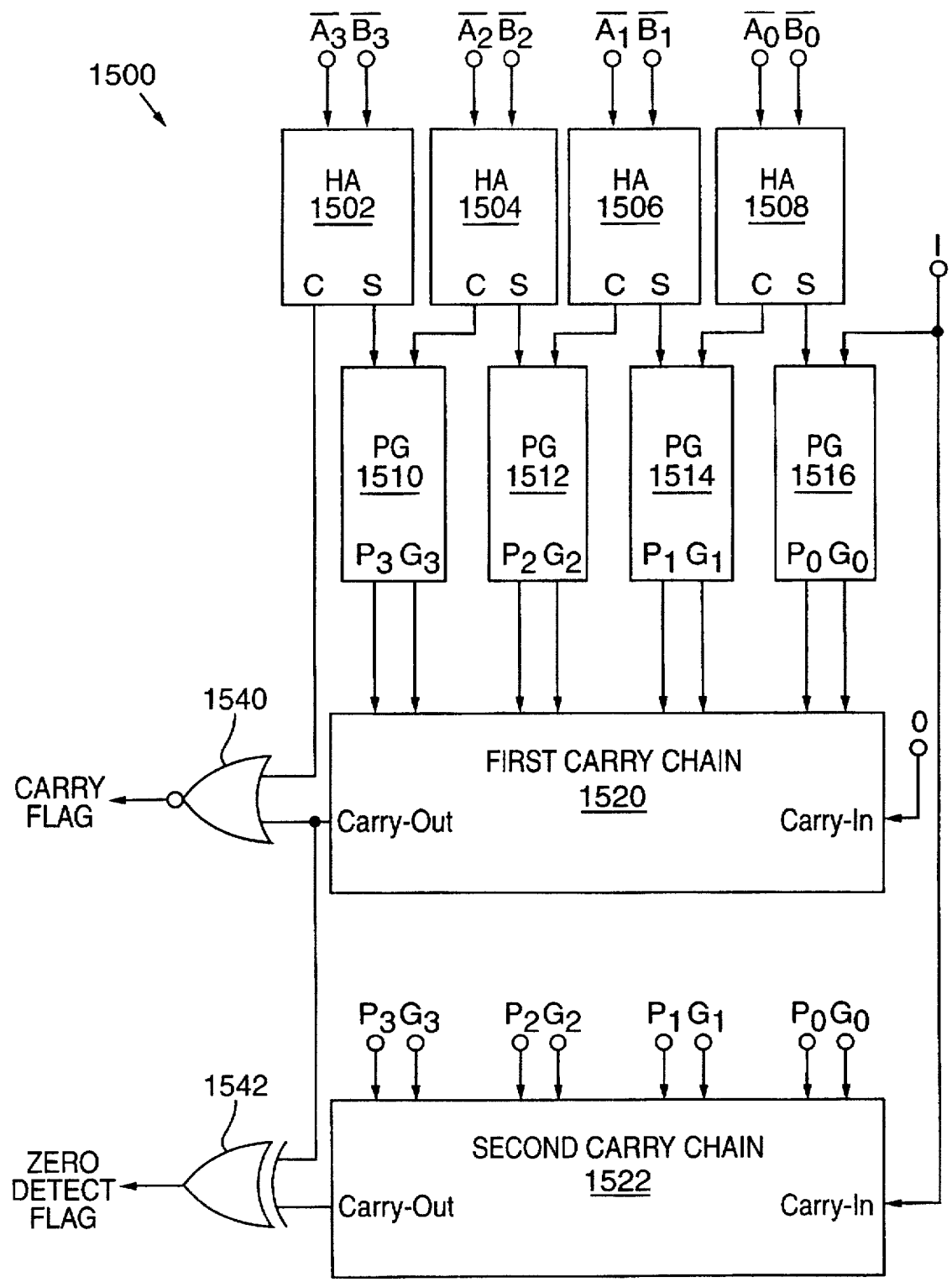
FIG. 15 is a block diagram of a combined carry circuit, inspection circuit and inverter suitable for use in the logic circuit of FIG. 11.

FIG. 15 shows an implementation of carry circuit 1106, inspection circuit 1112, and inverter 1114 in combination. Circuit 1500 is similar to circuit 1200, that is, half adder 1502 corresponds to half adder 1202, etc., except that NOR gate 1540 replaces EXCLUSIVE-OR gate 1224, and EXCLUSIVE-OR gate 1542 replaces EXCLUSIVE-OR gate 1226 and receives the carry-out bits from first carry chain 1520 and second carry chain 1522. Since the carry-out bits from half adder 1502 and first carry chain 1520 will not both be one's, EXCLUSIVE-OR gate 1224 can be replaced by an OR gate, and the combination of the OR gate and inverter 1114 can be simplified using NOR gate 1540 which provides the carry flag. It is observed that when the carry-out bit of half adder 1202 is a zero, then the carry-out bits of carry chains 1220 and 1222 provide the first and second carry-out bits, respectively. Likewise, when the carry-out bit of half adder 1202 is a one, then the complements of the carry-out bits of carry chains 1220 and 1222 provide the first and second carry-out bits, respectively. Since, however, inspection circuit 1112 evaluates whether the first and second carry-out bits have the same or different logical values, it makes no difference whether the first and second carry-out bits are both complemented (or toggled). Thus, EXCLUSIVE-OR gates 1224 and 1226 and inspection circuit 1112 can be simplified using EXCLUSIVE-OR gate 1542 which provides the zero detect flag. Accordingly, half adders 1502, 1504 1506 and 1508, PG sections 1510, 1512, 1514 and 1516, first carry chain 1520 and NOR gate 1540 implement first carry generator 1108 and inverter 1114, and half adders 1502 (without the carry-out bit), 1504, 1506 and 1508, PG sections 1510, 1512, 1514 and 1516, first carry chain 1520, second carry chain 1522 and EXCLUSIVE-OR gate 1542 implement first carry generator 1108, second carry generator 1110 and inspection circuit 1112.

Consider the case of zero detect for operands A, B and C, where C is a 1-bit carry-in bit. In accordance with expression (8), the first carry-out bit is generated by the sum $\overline{A}+\overline{B}+\overline{C}+2$, and the second carry-out bit is generated by the sum $\overline{A}+\overline{B}+\overline{C}+3$. When C is a zero, $\overline{C}$ is equivalent to negative one (using 2's complement representation), and therefore:

$$\overline{A}+\overline{B}+\overline{C}+2=\overline{A}+\overline{B}-1+2 \qquad (9)$$

$$\overline{A}+\overline{B}+\overline{C}+2=\overline{A}+\overline{B}+1 \qquad (10)$$

Likewise, $$\overline{A}+\overline{B}+\overline{C}+3=\overline{A}+\overline{B}-1+3 \qquad (11)$$

$$\overline{A}+\overline{B}+\overline{C}+3=\overline{A}+\overline{B}+2 \qquad (12)$$

Thus, when C is a zero, this is equivalent to the two operand case, in which the first carry-out bit is generated by the sum $\overline{A}+\overline{B}+1$, and the second carry-out bit is generated by the sum $\overline{A}+\overline{B}+2$. When, however, C is a one, $\overline{C}$ is equivalent to negative 2 (using 2's complement representation), and therefore:

$$\overline{A}+\overline{B}+\overline{C}+2=\overline{A}+\overline{B}-2+2 \qquad (13)$$

$$\overline{A}+\overline{B}+\overline{C}+2=\overline{A}+\overline{B} \qquad (14)$$

Likewise, $$\overline{A}+\overline{B}+\overline{C}+3=\overline{A}+\overline{B}-2+3 \qquad (15)$$

$$\overline{A}+\overline{B}+\overline{C}+3=\overline{A}+\overline{B}+1 \qquad (16)$$

Thus, when C is a one, the first carry-out bit is generated by the sum $\overline{A}+\overline{B}$, and the second carry-out bit is generated by the sum $\overline{A}+\overline{B}+1$.

Figure 16:
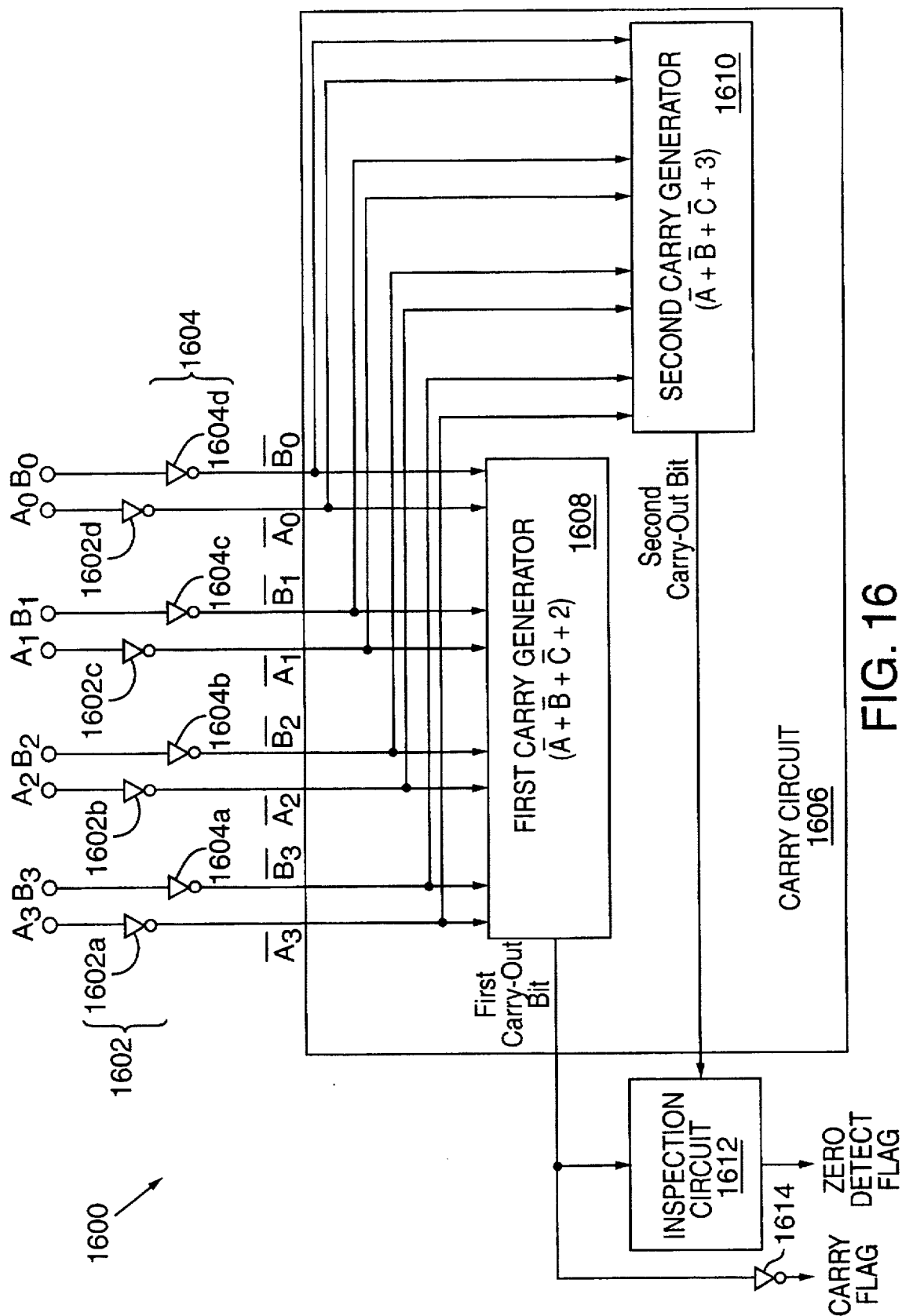
FIG. 16 is a block diagram of another logic circuit for performing zero detect in accordance with an embodiment of the invention.

FIG. 16 is a block diagram of a logic circuit 1600 for zero detection of a sum of four-bit binary operands A and B and carry-in bit operand C in accordance with another embodiment of the invention. Logic circuit 1600 is similar to logic circuit 1100 in several respects. For instance, first and second inverter circuits 1602 and 1604 are similar to first and second inverter circuits 1102 and 1104, respectively. Likewise, inspection circuit 1612 is similar to inspection circuit 1112, and inverter 1614 is similar to inverter 1114. However, logic circuit 1600 includes inverter 1605 that applies the complement of C to carry circuit 1606.

Carry circuit 1606 receives $\overline{A}$ and $\overline{B}$ and $\overline{C}$ at its operand inputs. In particular, bits $\overline{A}_3$ and $\overline{B}_3$ are applied to stage 3 of carry circuit 1606, bits $\overline{A}_2$ and $\overline{B}_2$ are applied to stage 2 of carry circuit 1606, and bits $\overline{A}_1$ and $\overline{B}_1$ are applied to stage 1 of carry circuit 1606, and bits $\overline{A}_0$ and $\overline{B}_0$ and $\overline{C}$ are applied to stage 0 of carry circuit 1606. Carry circuit 1606 includes first carry generator 1608 and second carry generator 1610. First carry generator 1608 provides a first carry-out bit corresponding to the carry-out bit from the most significant bit position (stage 3) of the sum of $\overline{A}$ plus $\overline{B}$ plus $\overline{C}$ plus two.

Similarly, second carry generator 1610 provides a second carry-out bit corresponding to the carry-out bit from the most significant bit position (stage 3) of the sum of $\overline{A}$ plus $\overline{B}$ plus $\overline{C}$ plus three. Inspection circuit 1612 receives the first and second carry-out bits from carry circuit 1606, outputs a logical one (thereby setting the zero detect flag to TRUE) if the first carry-out bit and the second carry-out bit have different logical values, and outputs a logical zero (thereby setting the zero detect flag to FALSE) if the first carry-out bit and the second carry-out bit have the same logical value. Likewise, inverter 1614 receives the first carry-out bit and provides a carry flag. Thus, the outputs of inspection circuit 1612 and inverter 1614 constitute the outputs of logic circuit 1600. Advantageously, first carry generator 1608 and second carry generator 1610 can determine the first and second carry-out bits concurrently, thereby providing for rapid zero detect.

Figure 17:
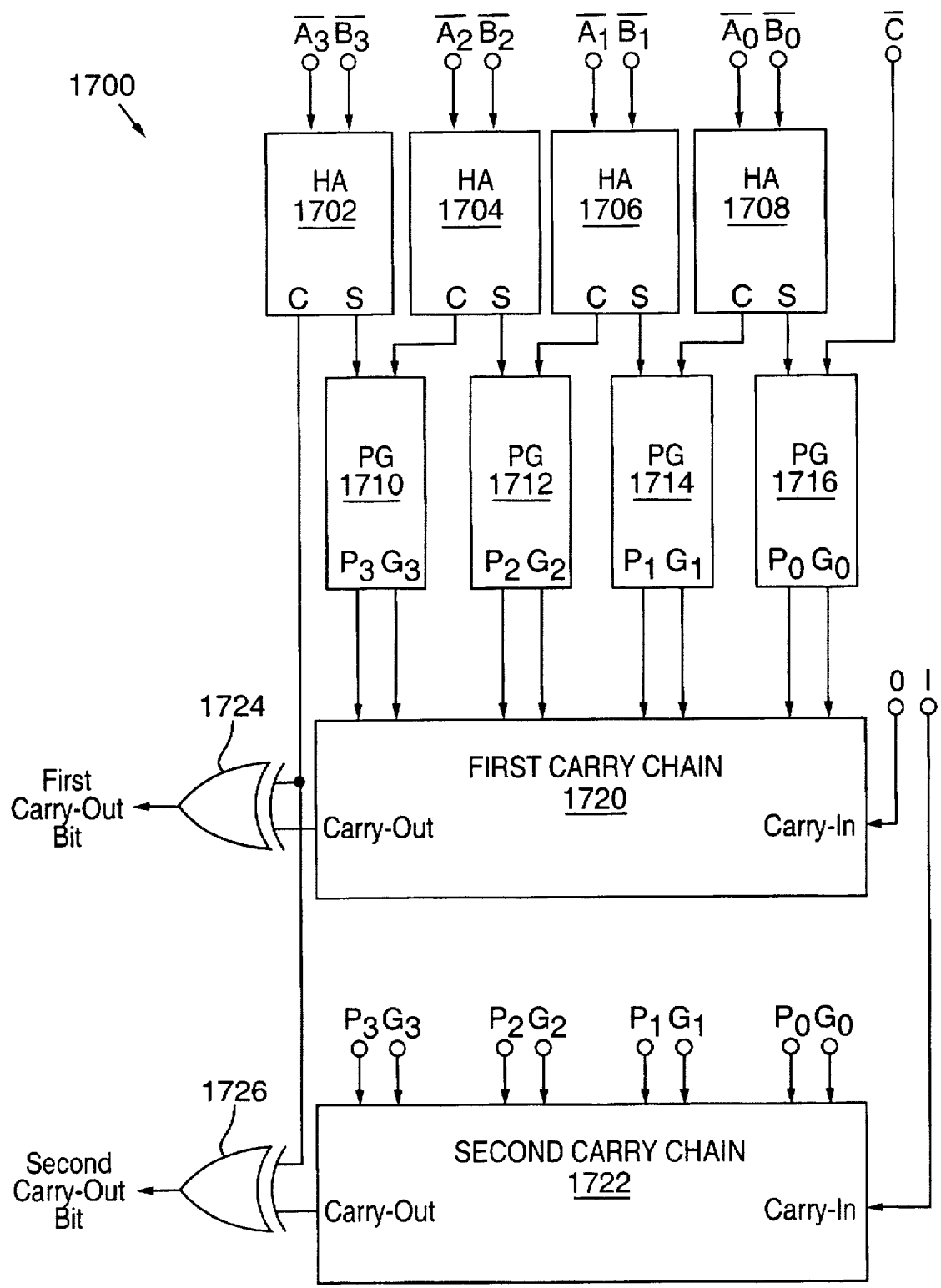
FIGS. 17–19 are block diagrams of carry circuits suitable for use in the logic circuit of FIG. 16.

FIG. 17 shows an implementation for carry circuit 1606. Circuit 1700 is similar to circuit 1200, that is, half adders 1702, 1704, 1706 and 1708, PG sections 1710, 1712, 1714 and 1716, first carry chain 1720 and second carry chain 1722, and first EXCLUSIVE-OR gate 1724 and second EXCLUSIVE-OR gate 1726 correspond to half adders 1202, 1204, 1206 and 1208, PG sections 1210, 1212, 1214 and 1216, first carry chain 1220 and second carry chain 1222, and first EXCLUSIVE-OR gate 1224 and second EXCLUSIVE-OR gate 1226, respectively, except that PG stage 1716 receives $\overline{C}$ as an input, instead of a one. When C is a zero, $\overline{C}$ is a one, and circuit 1700 provides the same result as circuit 1200, as it should since a zero C has no effect on the zero detect of operands A and B. When C is a one, $\overline{C}$ is a zero, first EXCLUSIVE-OR gate 1724 generates the first carry-out bit based on the sum of $\overline{A}+\overline{B}$, and second EXCLUSIVE-OR gate 1726 generates the second carry-out bit based on the sum of $\overline{A}+\overline{B}+1$, thereby providing the correct result.

Figure 18:
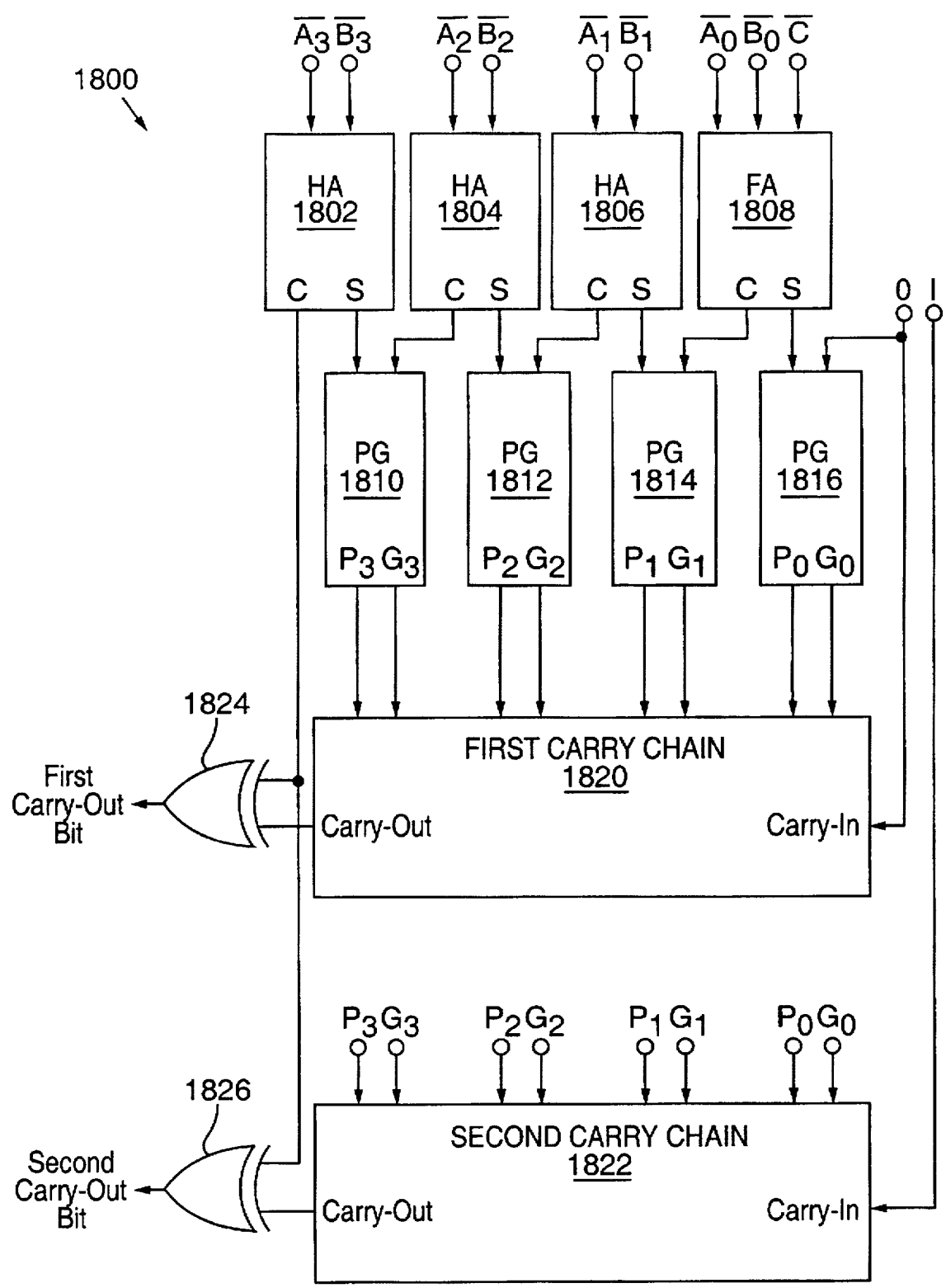

FIG. 18 shows another implementation for carry circuit 1606. Circuit 1800 is similar to circuit 1300, that is, half adders 1802, 1804 and 1806, full adder 1808, PG sections 1810, 1812, 1814 and 1816, first carry chain 1820 and second carry chain 1822, and first EXCLUSIVE-OR gate 1824 and second EXCLUSIVE-OR gate 1826 correspond to half adders 1302, 1304, and 1306, full adder 1308, PG sections 1310, 1312, 1314 and 1316, first carry chain 1320 and second carry chain 1322, and first EXCLUSIVE-OR gate 1324 and second EXCLUSIVE-OR gate 1326, respectively, except that full adder 1808 receives C as an input, instead of a one. When C is a zero, $\overline{C}$ is a one, full adder 1808 receives $\overline{A}$ and $\overline{B}$ and a one as inputs, and circuit 1800 provides the same result as circuit 1300, as it should since a zero C has no effect on the zero detect of operands A and B. When C is a one, $\overline{C}$ is a zero, first EXCLUSIVE-OR gate 1824 generates the first carry-out bit based on the sum of $\overline{A}+\overline{B}$, and second EXCLUSIVE-OR gate 1826 generates the second carry-out bit based on the sum of $\overline{A}+\overline{B}+1$, thereby providing the correct result.

Figure 19:
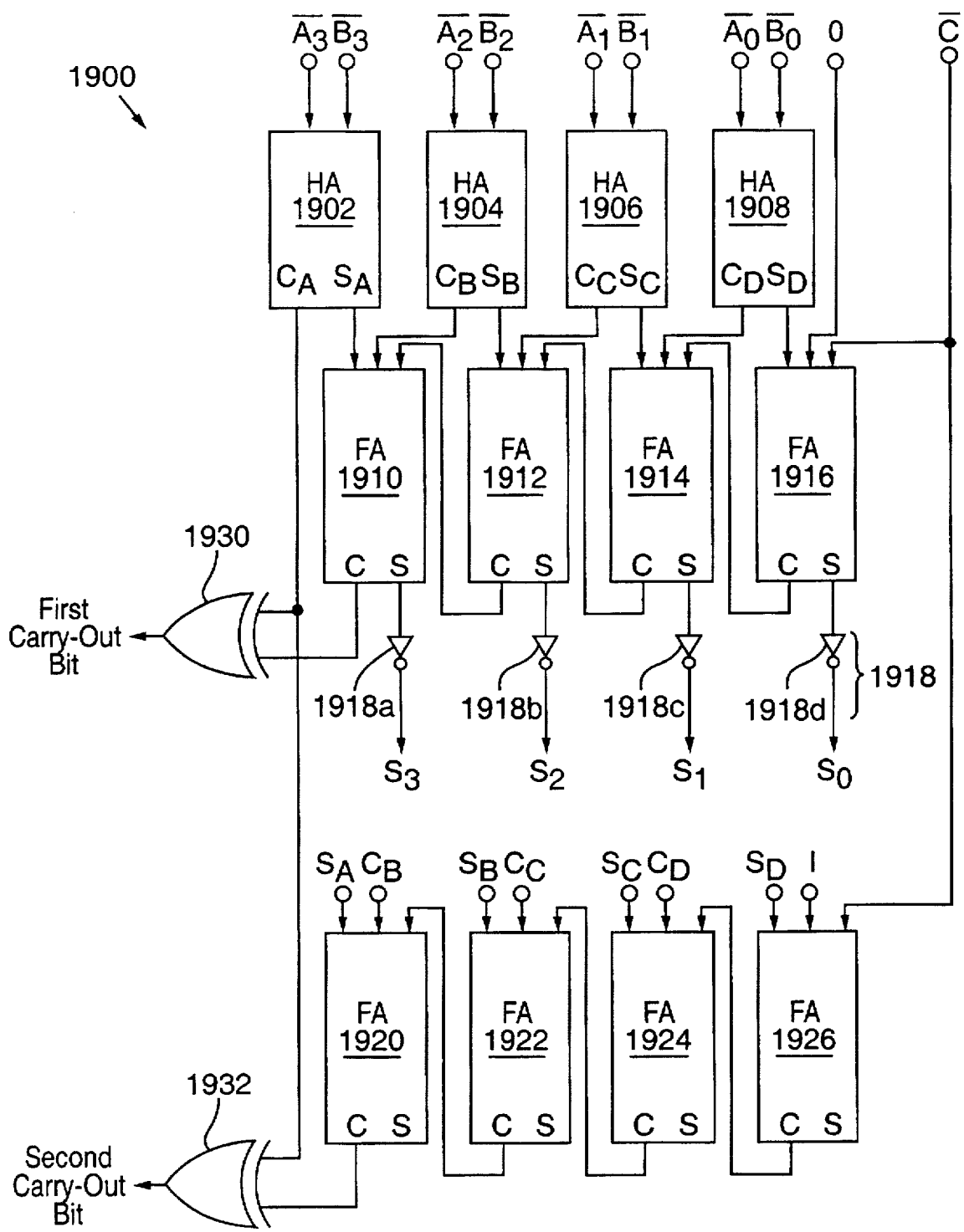

FIG. 19 shows another implementation for carry circuit 1606. Circuit 1900 is similar to circuit 1400, that is, half adders 1902, 1904, 1906 and 1908, full adders 1910, 1912, 1914, 1916, 1920, 1922, 1924 and 1926, inverters 1918a, 1918b, 1918c and 1918d, and first EXCLUSIVE-OR gate 1930 and second EXCLUSIVE-OR gate 1932 correspond to half adders 1402, 1404, 1406 and 1408, full adders 1410, 1412, 1414, 1416, 1420, 1422, 1424 and 1426, inverters 1418a, 1418b, 1418c and 1418d, and first EXCLUSIVE-OR gate 1430 and second EXCLUSIVE-OR gate 1432, respectively, except that full adders 1916 and 1926 receive $\overline{C}$ as an input, instead of a one. When C is a zero, $\overline{C}$ is a one, full adders 1916 and 1926 receive the same inputs as full adders 1416 and 1426, respectively, and circuit 1900 provides the same result as circuit 1400, as it should since a zero C has no effect on the zero detect of operands A and B. When C is a one, $\overline{C}$ is a zero, first EXCLUSIVE-OR gate 1930 generates the first carry-out bit based on the sum of $\overline{A}+\overline{B}$, and second EXCLUSIVE-OR gate 1932 generates the second carry-out bit based on the sum of $\overline{A}+\overline{B}+1$, thereby providing the correct result.

Figure 20:
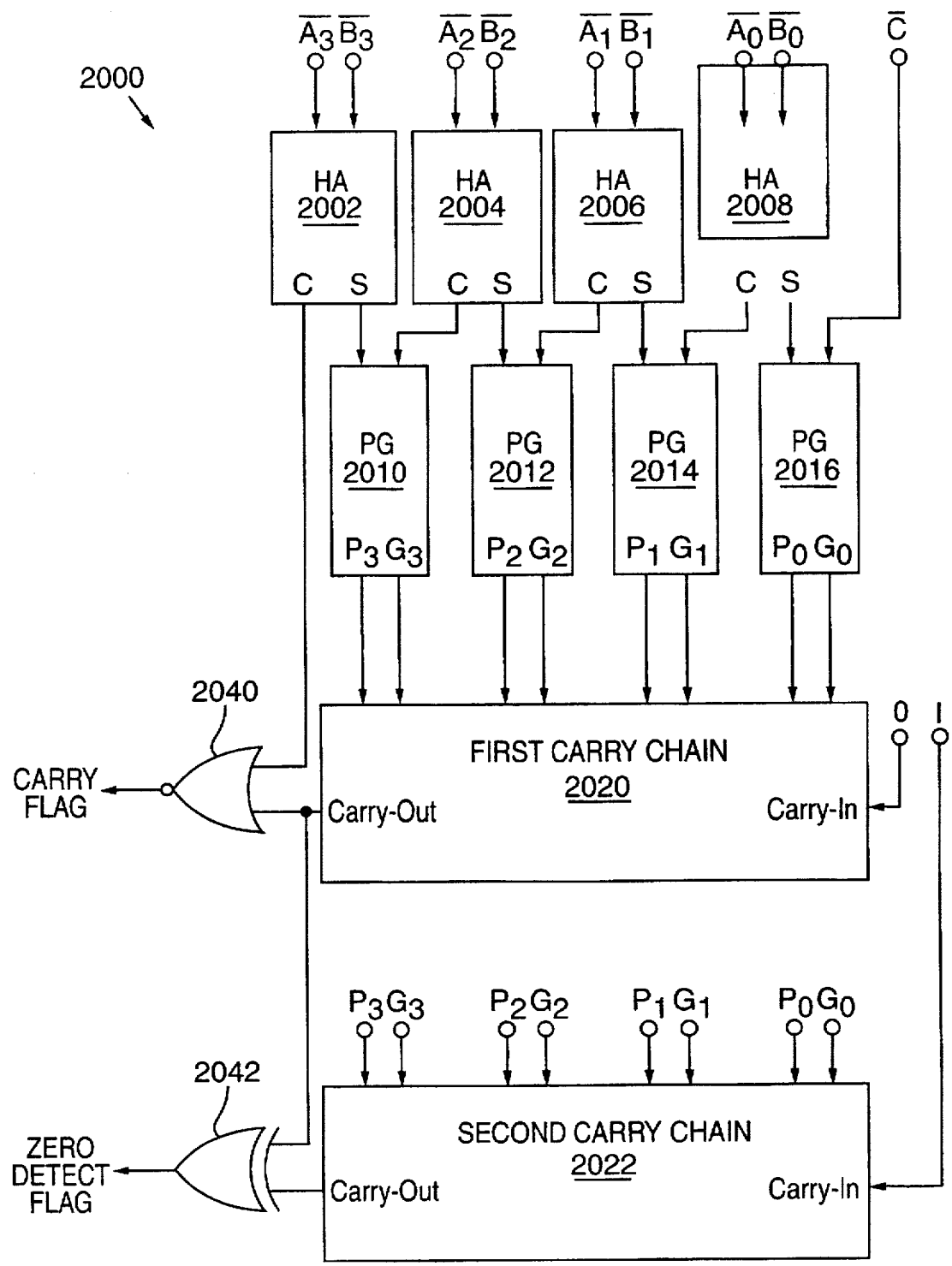
FIG. 20 is a block diagram of a combined carry circuit, inspection circuit and inverter suitable for use in the logic circuit of FIG. 16.

FIG. 20 shows an implementation of carry circuit 1606, inspection circuit 1612, and inverter 1614 in combination. Circuit 2000 is similar to circuit 1500, that is, half adders 2002, 2004, 2006 and 2008, PG sections 2010, 2012, 2014 and 2016, first carry chain 2020 and second carry chain 2022, and first EXCLUSIVE-OR gate 2040 and second EXCLUSIVE-OR gate 2042 correspond to half adders 1502, 1504, 1506 and 1508, PG sections 1510, 1512, 1514 and 1516, first carry chain 1520 and second carry chain 1522, and first EXCLUSIVE-OR gate 1540 and second EXCLUSIVE-OR gate 1542, respectively, except that PG stage 2016 receives $\overline{C}$ as an input, instead of a one. When C is a zero, $\overline{C}$ is a one, and circuit 2000 provides the same result as circuit 1500, as it should since a zero C has no effect on the zero detect of operands A and B. When C is a one, $\overline{C}$ is a zero, NOR gate 2040 provide carry detect based on the sum of $\overline{A}+\overline{B}$, and EXCLUSIVE-OR gate 2042 provides zero detect based on the sum of $\overline{A}+\overline{B}$ and the sum of $\overline{A}+\overline{B}+1$, thereby providing the correct result.

The description of the invention set forth herein is illustrative, and is not intended to limit the scope of the invention as set forth in the following claims. For example, the hardware set forth herein can be implemented in any suitable circuitry. Suitable PG generators, carry chains, sum generators, and adder circuits are well-known in the art. The operands can be any bit length of at least one. A general purpose computer or processor can execute the invention in a single instruction cycle (as is preferred) or multiple instruction cycles. The invention is well-suited for many applications including zero detect and sticky bit generation, as well as floating point and other binary operations, and is readily adaptable for detection of all one's within various patterns. Variations and modifications of the embodiments disclosed herein may be made based on the description set forth herein, without departing from the scope and spirit of the invention as set forth in the following claims.

What is claimed is:

1. A method of operating a circuit to determine whether a sum of operands is zero in a single instruction cycle, comprising:

providing a result representing a bit-complement of the sum; and inspecting a carry-out bit generated by incrementing the result.

2. The method of claim 1, wherein the carry-out bit is a one when the bit-complement of the sum consists of one's, and the carry-out bit is a zero when the bit-complement of the sum includes any zero's.

3. The method of claim 1, further including setting a zero detect flag to TRUE when the carry-out bit is a one, and setting the zero detect flag to FALSE when the carry-out bit is a zero.

4. The method of claim 1, further including setting a sticky bit to a zero when the carry-out bit is a one, and setting the sticky bit to a one when the carry-out bit is a zero.

5. The method of claim 1, wherein providing the result includes summing the operands to provide the sum and bit-complementing the sum.

19

6. The method of claim 1, wherein providing the result includes summing the operands to provide the sum and decrementing the sum.

7. The method of claim 1, further including bit-complementing the result thereby providing the sum of the operands.

8. The method of claim 1, wherein there are M operands, and providing the result includes bit-complementing the M operands and summing the bit-complemented M operands and a constant of M-1.

9. The method of claim 8, further including inspecting an additional carry-out bit generated by summing the bit-complemented M operands and the constant of M-1, wherein the additional carry-out bit represents a complemented carry-out bit of the sum of the M operands.

10. The method of claim 1, wherein the operands consist of first and second operands, and providing the result includes bit-complementing the first and second operands and summing the bit-complemented first and second operands and a constant of one.

11. The method of claim 10, further including inspecting an additional carry-out bit generated by summing the bit-complemented first and second operands and the constant of one, wherein the additional carry-out bit represents a complemented carry-out bit of the sum of the first and second operands.

12. The method of claim 1, performed during a floating point operation.

13. The method of claim 1, executed by a processor.

14. The method of claim 1, wherein the operands consist of first, second and third operands, and providing the result includes bit-complementing the first, second and third operands and summing the bit-complemented first, second and third operands and a constant of two.

15. The method of claim 14, wherein the third operand is a carry-in bit.

16. The method of claim 14, further including inspecting an additional carry-out bit generated by summing the bit-complemented first, second and third operands and the constant of two, wherein the additional carry-out bit represents a complemented carry-out bit of the sum of the first, second and third operands.

17. An apparatus for detecting a zero sum of M binary operands, comprising:
a sum adder for receiving the M operands and generating a sum output constituting a sum of the M operands;
an inverter circuit for bit-complementing the sum output; and
a carry generator for generating a carry-out bit based on incrementing the bit-complemented sum output, wherein the carry-out bit provides a zero detect flag.

18. The apparatus of claim 17, wherein the carry generator includes a second sum adder that calculates a sum of the bit-complemented sum output and one.

19. The apparatus of claim 17, wherein M is an integer in the range of two to three.

20. An apparatus for detecting a zero sum of M binary operands, comprising:
an inverter circuit for bit-complementing the M operands;
a sum adder for receiving the bit-complemented M operands and generating a sum output constituting a sum of the bit-complemented M operands and a constant of M-1; and
a carry generator for generating a carry-out bit based on incrementing the sum output, wherein the carry-out bit provides a zero detect flag.

20

21. The apparatus of claim 20, wherein M is an integer in the range of two to three.

22. A method of operating a circuit to determine whether a sum of M operands is zero in a single instruction cycle, comprising the steps of:
providing M operands;
bit-complementing the M operands;
generating a first carry-out bit representing a carry-out bit from a most significant bit position of a sum of the bit-complemented operands and a constant of M-1;
generating a second carry-out bit representing a carry-out bit from a most significant bit position of a sum of the bit-complemented operands and a constant of M; and
determining whether the first carry-out bit and the second carry-out bit have different logical values.

23. An apparatus for detecting a zero sum of M binary operands, comprising:
an inverter circuit for bit-complementing the operands;
a first carry generator for generating a first carry-out bit based on a sum of the bit-complemented operands and a constant of M-1;
a second carry generator for generating a second carry-out bit based on a sum of the bit-complemented operands and the constant of M; and
an inspection circuit for determining whether the first and second carry-out bits have different logical values.

24. The apparatus of claim 23, wherein the inspection circuit sets a sticky bit to zero when the first and second carry-out bits have different logical values, and otherwise sets the sticky bit to one.

25. The apparatus of claim 23, wherein the operands consist of first and second operands, and the constant of M is two.

26. The apparatus of claim 23, wherein the operands consist of first, second and third operands, the third operand is a carry-in bit, and the constant of M is three.

27. The apparatus of claim 23, wherein the first and second carry-out bits are generated concurrently.

28. The apparatus of claim 23, wherein the inspection circuit sets a zero detect flag to TRUE when the first and second carry-out bits have different logical values, and otherwise sets the zero detect flag to FALSE.

29. The apparatus of claim 28, wherein the inspection circuit includes an EXCLUSIVE-OR gate which receives the first and second carry-out bits as inputs.

30. The apparatus of claim 23, wherein the first carry generator includes a sum adder which provides a sum output representing a sum of the M operands and the constant of M-1.

31. The apparatus of claim 30, wherein the first carry generator includes an inverter circuit coupled to sum adder, wherein the inverter circuit bit-complements the sum output thereby providing a sum of the operands.

32. The apparatus of claim 30, wherein the second carry generator includes a second sum adder which provides a second sum output representing a sum of the bit-complemented operands and the constant of M.

33. The apparatus of claim 23, wherein the first carry generator includes a first row of carry save adders, and the second carry generator includes a second row of carry save adders.

34. The apparatus of claim 33, further including a plurality of inverters wherein each of the inverters receives a sum bit from one of the carry save adders in the first row, wherein an output of the inverters provides a sum of the operands.

35. The apparatus of claim 33, wherein the first and second carry generators include a third row of carry save adders, and each of the carry save adders in the third row is coupled to a carry save adder in the first row and a carry save adder in the second row.

36. The apparatus of claim 35, wherein the carry save adders in the first and second rows are full adders, and the carry save adders in the third row are half adders.

37. The apparatus of claim 36, wherein the carry save adders in the third row include a first half adder that receives least significant bits of the bit-complemented operands, the carry save adders in the first row include a full adder that receives a sum bit from the first half adder and a zero and a one, and the carry save adders in the second row include a full adder that receives the sum bit from the first half adder and a pair of one's.

38. The apparatus of claim 23, wherein the first carry generator includes a first carry chain having a carry-in bit set to zero, and the second carry generator includes a second carry chain having a carry-in bit set to one.

39. The apparatus of claim 38, wherein the first and second carry generators include propagate-generate sections coupled to the first and second carry chains.

40. The apparatus of claim 39, wherein each of the propagate-generate sections is coupled to the first and second carry chains.

41. The apparatus of claim 39, wherein the first and second carry generators include carry save adders with inputs coupled to the inverter circuit and outputs coupled to the propagate-generate sections.

42. The apparatus of claim 41, wherein the carry save adders include a full adder that receives least significant bits of the bit-complemented operands and a third input signal.

43. The apparatus of claim 42, wherein the operands consist of first and second operands, and the third input signal is a one.

44. The apparatus of claim 42, wherein the operands consist of first, second and third operands, the third operand is a carry-in bit, and the third input signal is a complement of the third operand carry-in bit.

45. The apparatus of claim 41, wherein the carry save adders include a first adder that receives least significant bits of the bit-complemented operands, and the propagate-generate sections include a first propagate-generate section that receives a sum bit from the first adder and a second input signal.

46. The apparatus of claim 45, wherein the operands consist of first and second operands, and the second input signal is a zero.

47. The apparatus of claim 45, wherein the operands consist of first, second and third operands, the third operand is a carry-in bit, and the second input signal is a complement of the third operand carry-in bit.

48. An apparatus for determining whether a sum of M binary operands is zero, comprising:
means for bit-complementing the M operands;
means for determining a first carry-out bit representing a carry-out bit of a sum of the bit-complemented M operands and a constant of M-1;
means for determining a second carry-out bit representing a carry-out bit of a sum of the bit-complemented M operands and a constant of M; and
means for determining whether the first carry-out bit and the second carry-out bit have different logical values, thereby setting a zero detect flag to TRUE.

49. The apparatus of claim 48, wherein M is an integer in the range of two to three.

50. The apparatus of claim 48, wherein the means for determining the first carry-out bit includes a first carry chain having a carry-in bit set to zero, and the means for determining the second carry-out bit includes a second carry chain having a carry-in bit set to one.

51. The apparatus of claim 48, wherein the means for determining the first carry-out bit and the means for determining the second carry-out bit include first, second and third rows of carry save adders.

52. The apparatus of claim 48, further including means for summing the operands, wherein the means for determining the first carry-out bit includes a sum adder, and the means for summing the operands includes an inverter circuit coupled to a sum output of the sum adder.

53. The apparatus of claim 48, wherein the means for determining the different logical values includes an EXCLUSIVE-OR gate for receiving the first and second carry-out bits.

54. The apparatus of claim 48, wherein the means for determining the first carry-out bit and the means for determining the second carry-out bit generate the first and second carry-out bits concurrently.

55. A method of operating a circuit to determine whether a sum of first and second operands is zero in a single instruction cycle, comprising the steps of:
providing first and second n-bit operands;
bit-complementing the first operand;
bit-complementing the second operand;
generating a first carry-out bit representing a carry-out bit from a most significant bit position of an n-bit sum of the bit-complemented first and second operands and a constant of one;
generating a second carry-out bit representing a carry-out bit from a most significant bit position of an n-bit sum of the bit-complemented first and second operands and a constant of two; and
determining whether an EXCLUSIVE-OR of the first carry-out bit and the second carry-out bit is a one.

56. The method of claim 55, further including setting a zero detect flag to TRUE when the EXCLUSIVE-OR is a one, and otherwise setting the zero detect flag to FALSE.

57. The method of claim 55, further including complementing the first carry-out bit thereby providing a carry-out bit of the sum of the first and second operands.

58. The method of claim 55, performed without calculating the sum of the bit-complemented first and second operands and the constant of one.

59. The method of claim 55, performed without calculating the sum of the bit-complemented first and second operands and the constant of two.

60. The method of claim 55, wherein generating the first carry-out bit includes coupling the bit-complemented first and second operands to carry save adders, coupling the carry save adders to propagate-generate sections, and coupling the propagate-generate sections to a first carry chain having a carry-in bit set to zero, whereas generating the second carry-out bit includes coupling the propagate-generate sections to a second carry chain having a carry-in bit set to one.

61. A method of operating a circuit to determine whether a sum of first and second operands and a carry-in bit is zero in a single instruction cycle, comprising the steps of:
providing first and second n-bit operands and a carry-in bit;
bit-complementing the first operand;

bit-complementing the second operand;

bit-complementing the carry-in bit;

generating a first carry-out bit representing a carry-out bit of an n-bit sum of the bit-complemented first operand, the bit-complemented second operand, the bit-complemented carry-in bit and a constant of two;

generating a second carry-out bit representing a carry-out bit of an n-bit sum of the bit-complemented first operand, the bit-complemented second operand, the bit-complemented carry-in bit and a constant of three; and determining whether an EXCLUSIVE-OR of the first carry-out bit and the second carry-out bit is a one.

62. The method of claim 61, including setting a zero detect flag to TRUE when the EXCLUSIVE-OR is a one, and otherwise setting the zero detect flag to FALSE.

63. The method of claim 61, further including complementing the first carry-out bit thereby providing a carry-out bit of the sum of the first and second operands and the carry-in bit.

64. The method of claim 61, performed without calculating the sum of the bit-complemented first operand, the bit-complemented second operand, the bit-complemented carry-in bit and the constant of two.

65. The method of claim 61, performed without calculating the sum of the bit-complemented first operand, the bit-complemented second operand, the bit-complemented carry-in bit and the constant of three.

66. The method of claim 61, wherein generating the first carry-out bit includes coupling the bit-complemented first and second operands to carry save adders, coupling the carry save adders to propagate-generate sections, and coupling the propagate-generate sections to a first carry chain having a carry-in bit set to zero, whereas generating the second carry-out bit includes coupling the propagate-generate sections to a second carry chain having a carry-in bit set to one.

* * * * *